(12) United States Patent
Van Breems

(10) Patent No.: US 6,833,631 B2
(45) Date of Patent: Dec. 21, 2004

(54) APPARATUS AND METHODS FOR ENERGY CONVERSION IN AN OCEAN ENVIRONMENT

(76) Inventor: Martinus Van Breems, 54 Beach Rd., Norwalk, CT (US) 06855

( * ) Notice: Subject to any disclaimer, the term of this patent is extended or adjusted under 35 U.S.C. 154(b) by 0 days.

(21) Appl. No.: 10/116,000

(22) Filed: Apr. 5, 2002

(65) Prior Publication Data

US 2002/0145288 A1 Oct. 10, 2002

Related U.S. Application Data

(60) Provisional application No. 60/281,590, filed on Apr. 5, 2001.

(51) Int. Cl.[7] ............................................. F03B 13/12
(52) U.S. Cl. ......................... 290/42; 290/53; 204/194; 310/15
(58) Field of Search ..................... 290/42, 53; 204/194; 310/15

(56) References Cited

U.S. PATENT DOCUMENTS

| | | | | |
|---|---|---|---|---|
| 2,093,351 | A | | 9/1937 | David |
| 3,696,251 | A | * | 10/1972 | Last et al. ..................... 290/53 |
| 4,232,230 | A | * | 11/1980 | Ames .......................... 290/53 |
| 4,437,963 | A | * | 3/1984 | Yeoman ................... 204/228.3 |
| 4,447,740 | A | | 5/1984 | Heck |
| 4,490,232 | A | * | 12/1984 | Lapeyre ....................... 204/278 |
| 4,539,495 | A | * | 9/1985 | Demler ......................... 327/63 |
| 5,167,786 | A | * | 12/1992 | Eberle ..................... 204/228.2 |
| 5,329,497 | A | * | 7/1994 | Previsic et al. ............. 367/141 |
| 5,347,186 | A | * | 9/1994 | Konotchick .................. 310/17 |
| 6,020,653 | A | * | 2/2000 | Woodbridge et al. ......... 290/53 |
| 6,104,097 | A | * | 8/2000 | Lehoczky ..................... 290/54 |
| 6,515,375 | B1 | * | 2/2003 | Beal ............................ 290/42 |

FOREIGN PATENT DOCUMENTS

| | | | |
|---|---|---|---|
| CA | 2099964 | 7/1993 | |
| CA | 2220044 | 1/1998 | |
| GB | 2 044 843 A | 3/1980 | |
| GB | 2 054 756 A | 7/1980 | |
| GB | 2 100 810 LA | 6/1982 | |
| JP | 55125364 A * | 9/1980 | ........... F03B/13/12 |
| JP | 55160967 A * | 12/1980 | .......... H02K/35/00 |
| JP | 40156241 A * | 5/1992 | |
| JP | 10030600 A * | 2/1998 | ............. F04F/1/18 |
| WO | WO 98/32967 | 7/1998 | |
| WO | WO0106118 A1 * | 1/2001 | |
| WO | WO0106119 A1 * | 1/2001 | |

* cited by examiner

Primary Examiner—Joseph Waks

(57) ABSTRACT

A wave power generator is characterized by an elongate inner member extending vertically in a body of water with its lower end constrained against vertical movement beneath the surface of the water, and an elongate outer flotation member mounted for linear movement along the length of the inner member in response to wave action. The outer member moves along the inner member with the length of the outer member extending along the length of the inner member. Movement of the outer member relative to and along the inner member effects relative linear movement between a coil and magnet to generate electrical power. The wave power generators may be used to supply electrical power to deep water hydrogen generators in which water is electrolyzed at great depths underwater to generate compressed hydrogen gas.

19 Claims, 9 Drawing Sheets

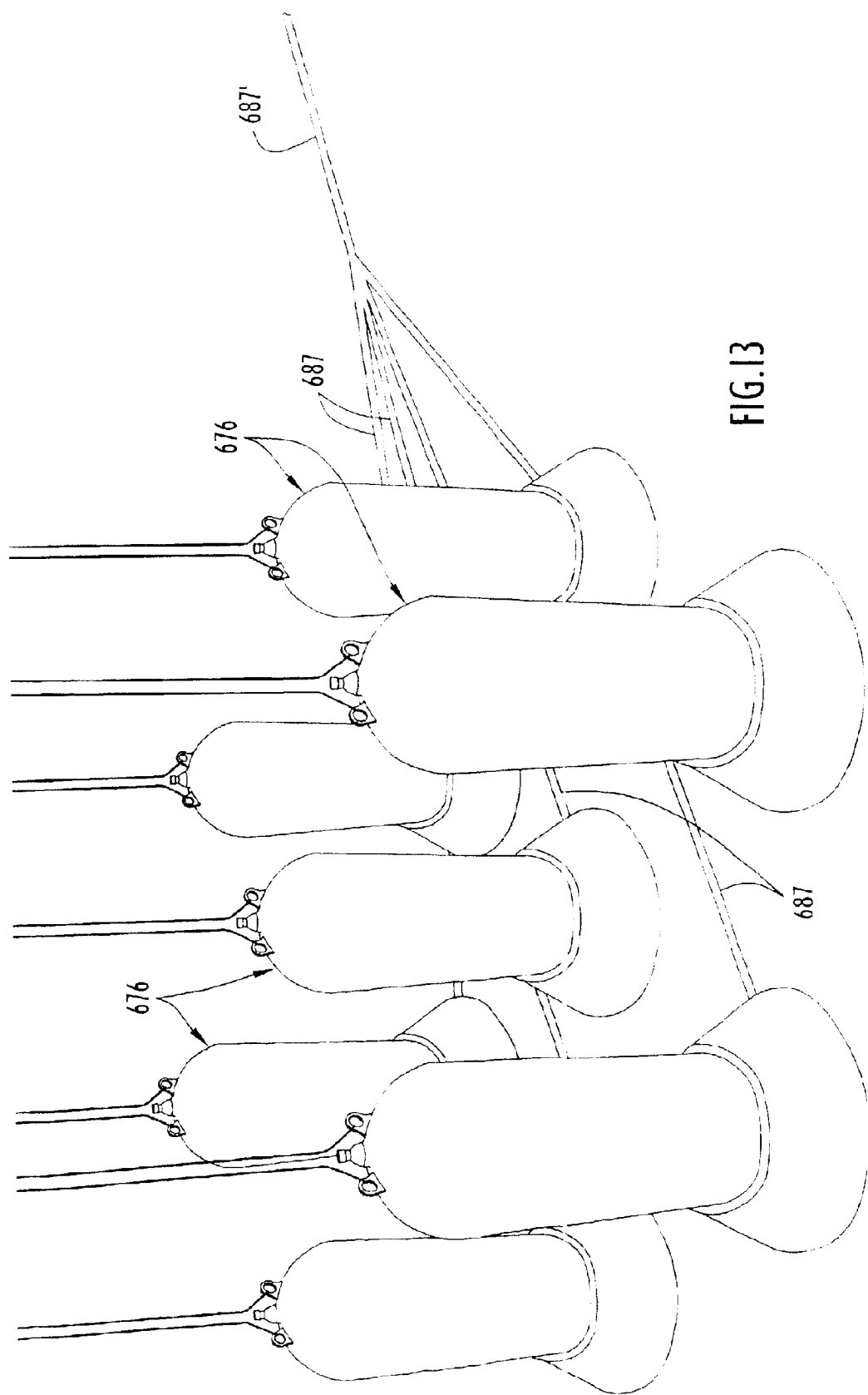

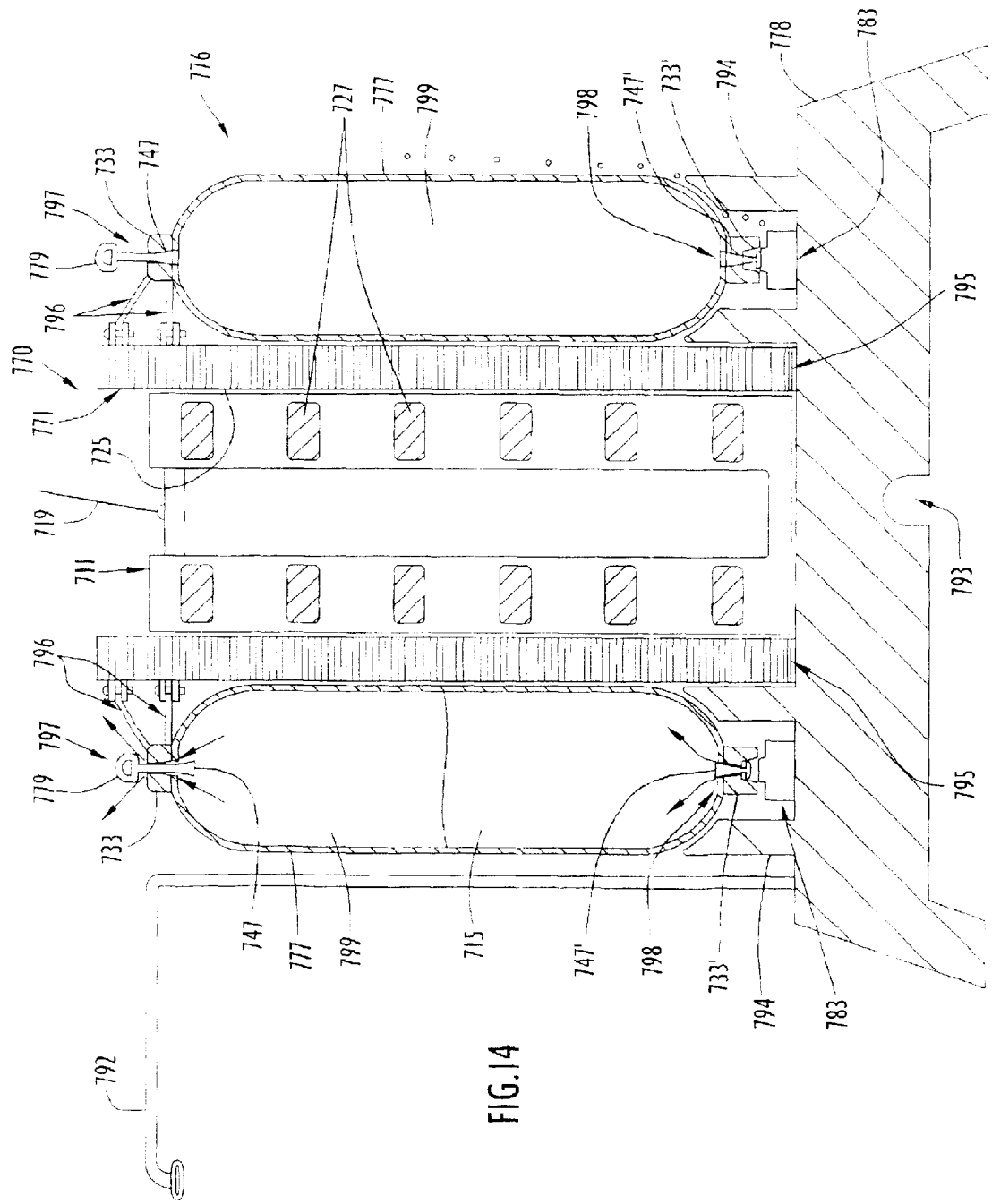

APPARATUS AND METHODS FOR ENERGY CONVERSION IN AN OCEAN ENVIRONMENT

CROSS-REFERENCE TO RELATED PATENT APPLICATIONS

This application claims priority from prior provisional patent application Ser. No. 60/281,590 filed Apr. 5, 2001, the entire disclosure of which is incorporated herein by reference.

BACKGROUND OF THE INVENTION

1. Field of the Invention

The present invention relates generally to useful conversion of energy and, more particularly, to wave power generators for generating electrical power from wave action, to deep water hydrogen generators for producing compressed hydrogen gas via electrolysis and to methods therefor.

2. Brief Description of the Related Art

Fossil fuels such as coal and oil are riot renewable, and their uses may be increasingly limited by growing environmental concerns. To meet the energy demands of an expanding world population, it will inevitably become necessary to generate power economically from renewable energy sources. As a naturally renewable energy source, waves represent a free and sustainable resource offering outstanding potential for generating renewable power. Despite the fact that nearly 75 percent of the earth's surface is covered with water, waves unfortunately remain a largely unexplored source of energy compared with the progress that has been made in harnessing the energy of the sun and wind.

Designing an apparatus to capture wave energy and convert it into electrical power possesses difficult engineering problems. Although wave power generators using the power of ocean waves to produce electricity have been proposed, wave power generators thus far proposed have not been entirely commercially successful due to many problems. One problem involves the structural complexity and unreliability of prior wave power generators. Prior wave power generators have generally failed to function properly and/or to endure in hostile, salt-laden ocean environments, which present extremely variable meteorological conditions ranging from calm weather and flat seas to winds, storms and waves in excess of forty feet. Particularly, conventional wave power generators are unable to withstand the expected, if not inevitable, occurrences of storms and of being run over by ships or other sea-going vessels. Another problem of conventional wave power generators is that they are prohibitively expensive in relation to the amount of energy they produce. Most conventional wave power generators are able to capture only a small fraction of the wave energy to which they are subjected and, even if all of the wave energy could be captured, the high cost of conventional wave power generators is likely to be greater than the amount of energy obtained. An additional problem is that many proposed wave power generators require a major investment in on-shore or near-shore infrastructure or equipment. Where on-shore or near-shore equipment must be installed, the equipment itself-may-be subjected to the impact of crashing waves and may thusly be susceptible to premature failure.

Another valuable source of power is hydrogen gas, which is currently being explored for use as a fuel in internal combustion engines, fuel cells, heating and cooling applications, transportation applications as well as various other applications. Hydrogen is also used to make various products including ammonia, methanol, gasoline, heating oil, rocket fuel, fertilizers, glass, refined metals, vitamins, cosmetics, semiconductor circuits, soaps, lubricants, cleaners, margarine, and peanut butter. The use of hydrogen as a fuel represents a clean, safe and efficient energy source which would reduce dependency on petroleum fuel. One method of generating hydrogen gas is electrolysis, i.e., the use of electrical energy to split water molecules into hydrogen and oxygen, and hydrogen generators using electrolysis have been proposed. A limitation to the use of electrolysis for hydrogen gas production is the need for electrical energy, which often times must be provided at substantial cost. Another limitation is that the hydrogen gas produced by electrolysis must normally be compressed prior to use, thusly requiring additional specialized equipment and procedures which consume significant amounts of power and decrease the efficiency of the hydrogen gas production process.

Accordingly, there is a need for wave power generators which are simple, reliable, capable of operating efficiently for long durations in remote ocean environments and which are cost-effective in relation to the energy produced. There is also a need for deep water hydrogen generators whereby hydrogen gas produced therefrom is compressed as a consequence of the hydrogen generators being disposed significant depths underwater without the need for any additional specialized structure or procedures. A need further exists for wave power generators that can be used to power deep water hydrogen generators.

SUMMARY OF THE INVENTION

Accordingly, it is a primary object of the present invention to overcome the aforementioned disadvantages of prior wave power generators and hydrogen generators.

A further object of the present invention is to economically generate electrical and/or hydrogen power in ocean environments.

Another object of the present invention is to utilize the vertical motion of waves to generate electrical power in simple, economically feasible wave power generators capable of withstanding ocean environments.

Moreover, it is an object of the present invention to utilize discarded tires to create a bellows-type wave power generator for generating electrical power from wave action.

It is also an object of the present invention to utilize wave action to obtain relative linear movement between a coil and magnet to generate electrical power.

A still further object of the present invention is to utilize a surface flotation device which is subjected to wave action to effect relative linear movement between an underwater coil and magnet to produce electrical power.

It is another object of the present invention to provide a simple, self-contained wave and wind power generator.

Additionally, it is an object of the present invention to locate a hydrogen generator at an underwater depth sufficient to result in pressurization of hydrogen gas produced by the hydrogen generator.

The present invention has as a further object to produce compressed hydrogen gas as a natural consequence of performing electrolysis a significant depth under water.

An additional object of the present invention is to increase the efficiency of deep water electrolysis by heating the water for electrolysis using artificial or natural heat sources.

Yet another object of the present invention is to utilize wave action to power deep water hydrogen generators.

Some of the advantages of the present invention are that electrical power produced by the wave power generators can be transmitted to various remote locations; discarded tires can be used to form an air bellows in the bellows-type wave power generators; the air bellows can have various other useful applications including flotation, crash protection and shock absorption; automated procedures can be used to connect the tires to form the air bellows; the tires can be connected in various ways; environmental conditions are enhanced since discarded tires can be put to beneficial use; tires are particularly well suited to a marine environment; a plurality of air bellows can be bundled together for increased structural integrity and/or air volume; the wave power generators may be fitted with various accessories; electric power generated by the wave power generators may be used to power the accessories; wind generators may be incorporated in the wave power generators for increased energy production; various turbine generators may be incorporated in the wave power generators to convert mechanical movement into electrical energy; a plurality of wave power generators may be interconnected for cumulative energy production; linear wave power generators incorporating a coil and magnet can have the coil moveable relative to the magnet or vice versa; linear wave power generators may be completely submerged underwater for operation via a remote spar buoy or flotation device; the hydrogen generators may be powered by the wave power generators or any other electrical source; hydrogen may be advantageously produced in deep water as found in various natural and man-made bodies of water including oceans, lakes and deep wells; various geothermal heat sources can be used to heat the water used for electrolysis; a plurality of hydrogen generators can be interconnected; hydrogen gas produced by the hydrogen generators can be transported to various remote locations for storage and/or use; the hydrogen generators are self-regulating; linear electric generators can be incorporated in the hydrogen generators; and on-site repairs can be preformed on the hydrogen generators for cost-effectiveness, convenience and reduced downtime.

These and other objects, advantages and benefits are realized with the present invention as generally characterized in a wave power generator for being deployed in a body of water presenting wave action and comprising an elongate air bellows, a flotation member and a turbine generator. The air bellows is disposed vertically in the water and has a closed lower end, an open upper end and a longitudinal internal channel extending from the lower end to the upper end. The lower end is constrained against vertical movement beneath a surface of the water and the upper end is movable upwardly and downwardly relative to the lower end so that the air bellows is expandible and contractible in a longitudinal or axial direction. The flotation member is buoyant and is attached to the upper end of the air bellows. The flotation member defines an interior in communication with the channel, and a top of the flotation member is provided or formed with an opening. The opening is disposed above the surface of the water and establishes communication between the interior and the atmosphere. The opening, the interior and the internal channel define an air flow passage. The flotation member moves upwardly and downwardly with the water in response to the wave action, causing corresponding expansion and contraction of the air bellows. Expansion of the air bellows causes atmospheric air to flow into the air flow passage via the opening, while contraction of the air bellows causes air to flow out of the air flow passage. The turbine generator is disposed in the air flow passage and a plurality of turbine blades of the turbine generator are rotated by the air flowing into and out of the air flow passage. The turbine generator converts mechanical rotation of the turbine blade into electrical power.

The air bellows is preferably formed by a plurality of tires connected to one another in side to side relation, and discarded tires ray be used for the air bellows. Adjacent tires may be connected to one another using a connecting member or grommet. The plurality of interconnected tires, when filled with a compressible material, form a cushioning structure useful in various other applications.

An alternative wave power generator according to the present invention is generally characterized in an elongate inner member for being disposed vertically in a body of water presenting wave action and an outer flotation member mounted for linear movement relative to and along the inner member. The inner member comprises a lower end constrained against vertical movement beneath the surface of the water and an upper end disposed above the surface of the water. The outer flotation member is buoyant to move linearly upwardly and downwardly along the inner member in response to the wave action. A coil is disposed on one of the inner member or the flotation member, and a magnet is disposed on the other of the inner member or the flotation member adjacent the coil. Linear movement of the flotation member along the inner member in response to the wave action effects relative linear movement between the coil and magnet to produce electrical power.

Another alternative wave power generator according to the present invention is generally characterized in an underwater linear electric generator, a surface flotation member and a connecting line connecting the flotation member with the linear electric generator. The linear electric generator is submerged below the surface of a body of water, typically at substantial depths. The linear electric generator comprises an elongate inner member for being disposed vertically in the water, an outer member disposed alongside the inner member, a coil disposed on one of the inner member or the outer member, and a magnet disposed on the other of the inner member or the outer member. A first one of the inner member or the outer member is constrained against vertical movement in the water, while a second one of the inner member or the outer member is linearly movable upwardly and downwardly relative to and along the constrained first one of the inner member or the outer member. The surface flotation member, which is buoyant, rises and falls vertically with the surface of the water in response to wave action. The connecting line is connected with the second one of the inner member or the outer member and transmits vertical movements of the flotation member to the second one of the inner member or the outer member. Accordingly, vertical movements of the flotation member effect relative linear movement between the inner member and the outer member and, therefore, between the magnet and the coil, to produce electrical power. The surface flotation member is preferably a spar buoy, and the connecting line is preferably connected between the flotation member and the linear electric generator via a tensioning device.

The present invention is also generally characterized in a deep water hydrogen generation system comprising a deep water hydrogen generator according to the present invention and a source of electrical power coupled with the deep water hydrogen generator. The deep water hydrogen generator comprises a transfer chamber having a collection point submerged underwater at great depths and an electrolysis unit adjacent the collection point for electrolyzing the water to generate compressed hydrogen gas, which is directed into the transfer chamber. The source of electrical power supplies electricity to the hydrogen generator to electrolyze the water. The wave power generators of the present invention may be used as the source of electrical power, but any other suitable electrical power source can be used. The deep water hydrogen generator may incorporate an underwater linear electric generator for generating the electrical power needed for electrolysis. For increased efficiency, the water to be electrolyzed may be heated using various artificial and/or natural heat sources.

The present invention is further generally characterized in a method of producing electrical power from wave action comprising the steps of expanding and contracting an air bellows longitudinally in response to upward and downward movements of a flotation member subjected to wave action at a surface of a body of water, causing atmospheric air to flow into the air bellows in response to the expanding, causing air to flow out of the air bellows in response to the contracting, using the air flowing into and out of the air bellows to rotate the turbine blades of a turbine generator, and converting mechanical rotation of the turbine blades into electrical power.

Another method of producing electrical power from wave action in accordance with the present invention is generally characterized in the steps of moving an outer flotation member vertically upwardly and downwardly along an inner member in response to wave action to which the flotation member is subjected at a surface of a body of water, effecting relative linear movement between a coil and a magnet in response to the moving, and generating electrical power from the relative linear movement between the coil and the magnet.

Yet another method of producing electrical power from wave action in accordance with the present invention is generally characterized in the steps of moving a flotation member vertically upwardly and downwardly in response to wave action to which the flotation member is subjected at a surface of a body of water, transferring the upward and downward vertical movements of the flotation member to an underwater linear electric generator, moving a first member of the linear electric generator linearly upwardly and downwardly relative to and along a stationary second member of the linear electric generator in response to the upward and downward vertical movements of the flotation member, effecting relative linear movement between a coil and a magnet in response to moving the first member relative to and along the second member, and generating electrical power from the relative linear movement between the coil and the magnet.

The present invention is also further generally characterized in a method of producing compressed hydrogen gas at great underwater depths comprising the steps of deploying a collection point of a transfer chamber underwater at a great depth, supplying electrical power to an electrolysis unit adjacent the collection point, electrolyzing the water to generate compressed hydrogen gas, and directing the compressed hydrogen gas into the transfer chamber.

Other objects, advantages and benefits of the present invention will become apparent from the following description of the preferred embodiments taken in conjunction with the accompanying drawings, wherein like parts in each of the several figures are identified by the same reference characters.

BRIEF DESCRIPTION OF THE DRAWINGS

FIG. 13 is a broken perspective view illustrating a plurality of interconnected deep water hydrogen generators according to the present invention.

FIG. 14 is a broken perspective view, partly in section, illustrating an alternative deep water hydrogen generator according to the present invention.

DETAILED DESCRIPTION OF THE PREFERRED EMBODIMENTS

Figure 1:
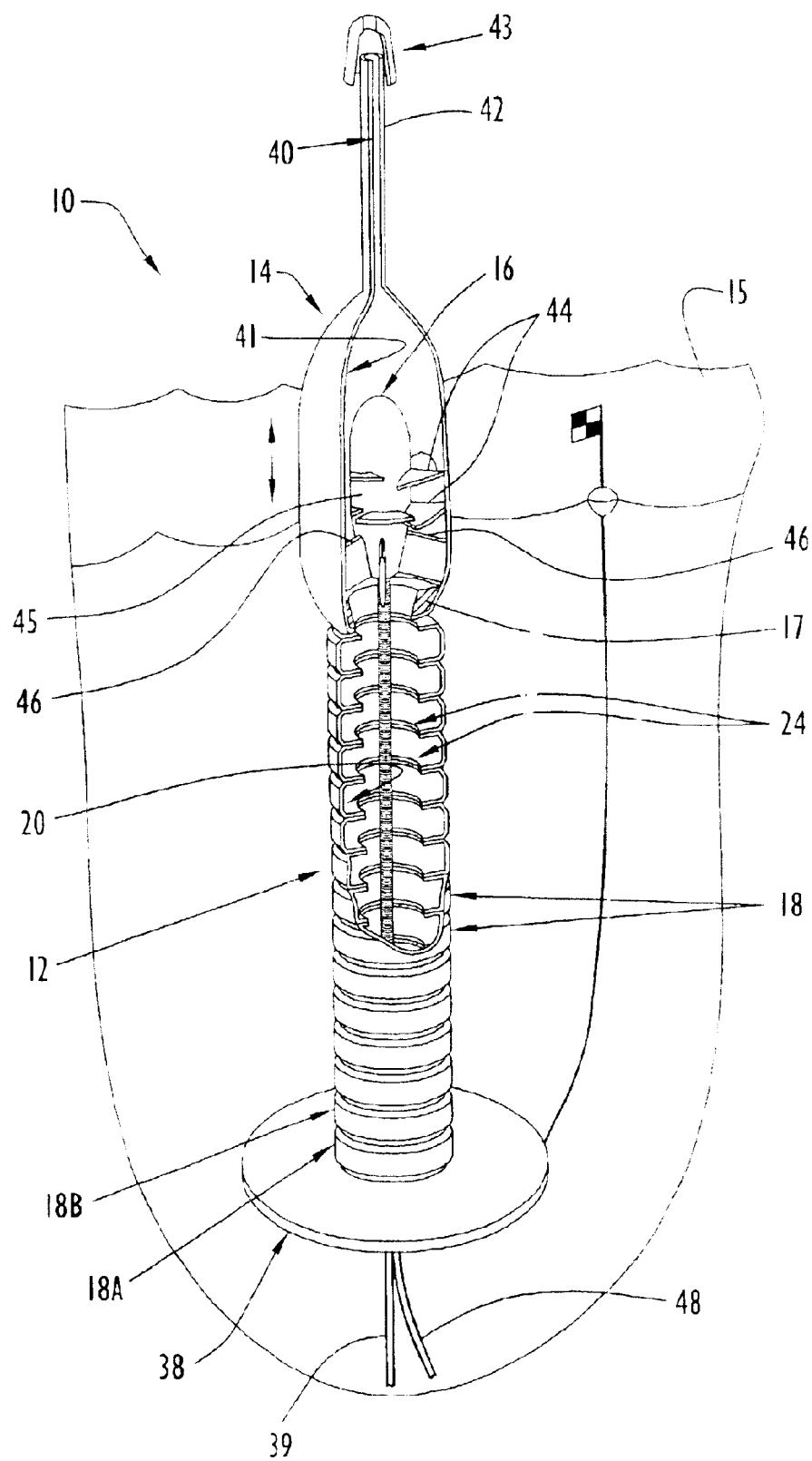
FIG. 1 is a broken perspective view, partly in section, of a wave power generator in accordance with the present invention.

A wave power generator 10 according to the present invention is illustrated in FIG. 1. Waver power generator 10 is a bellows-type wave power generator and includes an air bellows 12, a flotation member 14 attached to an upper end of air bellows 12, and a turbine generator 16. Air bellows 12 includes a hollow elongate or columnar structure that is air and water tight and that is capable of extension and retraction in its longitudinal or axial direction. Air bellows 12 can be formed in various ways but is depicted as being formed by a plurality of interconnected conventional rubber tires 18 as typically used on automobiles. Discarded tires can be used for air bellows 12 as long as they are free of leaks. Since tens of millions of automobile tires are discarded each year, putting these discarded tires to productive use will greatly benefit the environment. In addition, the availability of millions of discarded tires at little or no cost allows the wave power generator 10 to be constructed economically at minimal cost since the cost of materials can be greatly reduced. Rubber tires are well suited to water environments and are generally unaffected by salt water even after years of exposure. Tires may actually remain structurally sound for a longer time in marine environments due to the reduced presence of oxygen.

Figure 2:
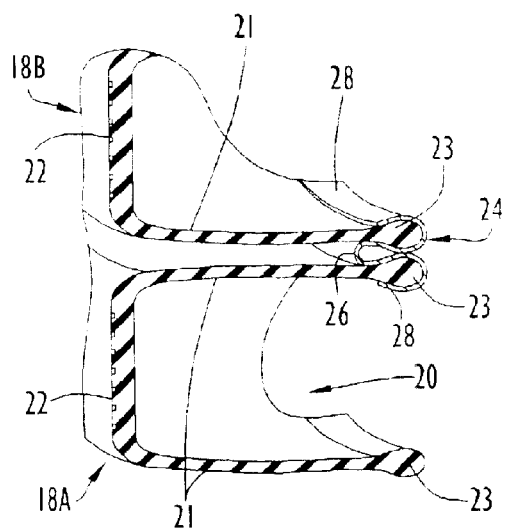
FIG. 2 is a fragmentary sectional view of an air bellows for the wave power generator of FIG. 1, the air bellows being formed by a plurality of interconnected tires.

The tires 18 are stacked and interconnected in side to side relationship to form the elongate or columnar structure, which defines a longitudinal or axial internal channel 20. FIG. 2 depicts a pair of adjacent tires 18A and 18B each having a pair of side walls 21, only one side wall 21 being shown for tire 18B. The sides walls 21 for each tire extend radially inwardly from a circumferential tire wall 22 to circumferential inner side edges, respectively, each terminating at a bead 23. The side walls 21 of adjacent tires are connected to one another; and, in the case of air bellows 12, an inner side edge of tire 18A has its bead 23 continuously connected to the bead 23 of an inner side edge of tire 18B. Where tire 18A is to be an end tire for the air bellows, the remaining inner side edge (not shown) of tire 18B is connected to an inner side edge of another tire 18 and so on until an elongate structure of desired length is obtained. With the inner side edges of a plurality of tires 18 thusly connected, the internal channel 20 is formed therethrough and the resulting elongate structure is extensible and retractable in its longitudinal or axial direction. Particularly, the length of the elongate structure is extensible or expandable in tension and is retractable, collapsible, compressible or contractible in compression due to the resiliency of the elongate structure in the longitudinal or axial direction, while the elongate structure is restricted against radial expansion due to the tread reinforcements in the circumferential tire walls 22.

Although adjacent tires 18 can be connected to one another in various ways, a connecting member 24, shown in FIG. 2, connects the inner side edges of adjacent tires 18. As shown in FIG. 2 for adjacent tires 18A and 18B, connecting member 24 includes a hoop or grommet which compresses and secures the inner side edges of the adjacent tires 18A and 18B together. Connecting member 24 is made of a malleable material, such as annealed stainless steel, and serves to compress the beads 23 of adjacent inner side edges of tires 18A and 18B, respectively, together while rolling over the beads 23 to lock the tires together in an air and water tight joint. The connecting member 24 includes a protruding lip 26 having an outer side formed as a bend or fold and an inner side connected to a pair of wings 28. The lip 26 is inserted between the adjacent inner side edges which are to be connected, and the wings 28 are rolled or bent over interior surfaces of the beads 23, respectively, which are to be connected. Preferably, the lip 26 has a teardrop shaped configuration in cross-section so as to present a surface complementary to an exterior surface of each adjacent bead 23, such that the lip 26 approximates the shape of a conventional automobile wheel rim with which the tire is normally designed to mate. In this manner, a more secure seal is formed at the connecting joint at which the adjacent tires 18A and 18B are connected to each other. When rolled over the exterior surfaces of beads 23, the wings 28 conform to or mate with the exterior surfaces, respectively, thereby further enhancing the structural strength and the seal at the connecting joint. The connecting member 24 can be formed integrally, unitarily as a single piece or can be formed as multiple separate pieces.

Figure 3:
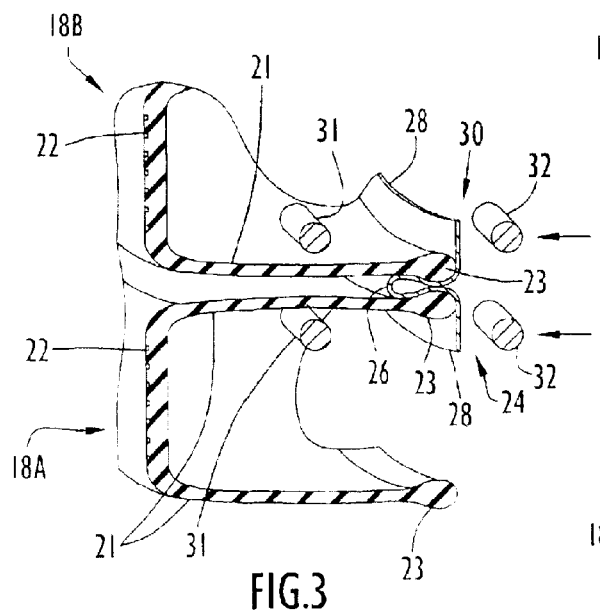
FIG. 3 is a fragmentary sectional view illustrating a connecting member inserted between a pair of tires.
Figure 4:
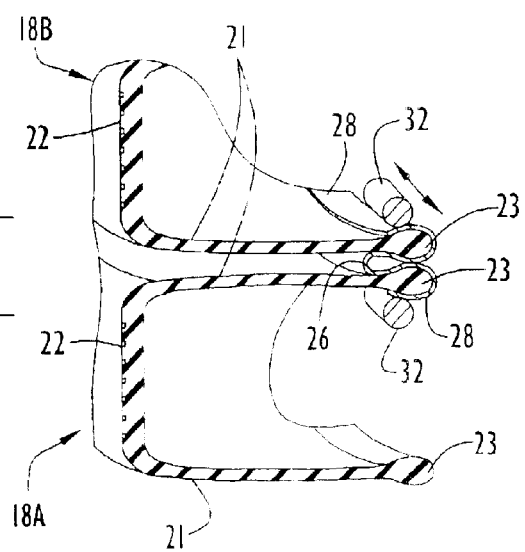
FIG. 4 is a fragmentary sectional view illustrating bending of the connecting member to mechanically interconnect the tires to form the air bellows of FIG. 2.

The connecting member 24 can be assembled to a pair of adjacent tires in various ways. FIGS. 3 and 4 generally depict a representative automated procedure in which adjacent tires 18A and 18B are interconnected using connecting member 24. Typically, a forming machine would be fed the tires 18A and 18B so that they are maintained in side to side relationship and would be used to insert the lip 26 of connecting member 24 between adjacent inner side edges of tires 18A and 18B as shown in FIG. 3. The forming machine may include one or more positioning arms for centering the connecting member 24 between the adjacent side walls 21 of tires 18A and 18B and may include one or more guides to hold the tires adjacent one anther. The forming machine will typically include a forming mechanism 30 including a pair of opposed clamping members 31 which clamp down on the adjacent or facing side walls 21 of tires 18A and 18B, respectively, thusly forcing the side walls 21 together. The clamping members 31 are illustrated as rollers but may be designed in various ways, preferably with an adjustable vertical separation distance therebetween. The forming mechanism 30 also includes a pair of forming members 32 which bend the wings 28 of connecting member 24 over the interior surfaces of beads 23, respectively. The forming members 32 can be designed in various ways but are preferably metal rollers. As shown in FIG. 3, the wings 28 may initially be bent outwardly from lip 26 in opposite directions, such that each wing 28 is engaged by a forming member 32 when the forming members are moved in a direction radial to tires 18A and 18B, i.e. in a direction toward circumferential tire walls 22, as shown by arrows in FIG. 3.

As shown in FIG. 4, continued movement of forming members 32 in the radial direction causes the forming members 32 to bend the wings 28, respectively, over the interior surfaces of beads 23. The forming members 32 follow the contour of the interior surfaces of beads 23 and, therefore, the wings 28 also follow the contour of the interior surfaces of beads 23 as they are bent by the forming members over the beads 23. Of course, the vertical separation distance between the forming members 32 may be adjustable to ensure that the wings 28 and beads 23 are compressed between the forming members with sufficient force. Also, the forming mechanism 30 may be designed to shape lip 26 in that the teardrop shaped cross-sectional configuration can be imparted to lip 26 by using the forming mechanism to compress the beads 23 toward one another. It should be appreciated that the lip 26 can thusly be shaped simultaneously with bending of the wings 28.

As indicated by an arrow in FIG. 4, the forming members 32 are moved circumferentially along the inner side edges of tires 18A and 18B, i.e. along beads 23, so that the wings 28 are bent over the beads 23, respectively, along the entire circumference of the inner side edges and beads. Forming members 32 are moved in one or more complete circumferential paths along the inner side edges or beads of the tires 18A and 18B until the tires are locked and sealed together at the thusly formed connecting joint. As the forming members 32 move circumferentially, the clamping members 31 may be retracted and used to grasp the next tire to be assembled to tire 18B. Once the connecting joint for tires 18A and 18B is formed, the tires 18A and 18B are indexed or moved relative to the forming members 32 one position so that the remaining inner side edge (not shown) of tire 18B and an inner side edge of the next tire are moved into place for being interconnected in the same manner using another connecting member 24. This procedure is repeated until an elongate structure of desired length is obtained. Although a metal grommet is preferred as the connecting members 24 for joining the tires, it should be appreciated that the tires may be joined by stitching using a strong thread or may be joined using other types of mechanical connecting members.

Figure 5:
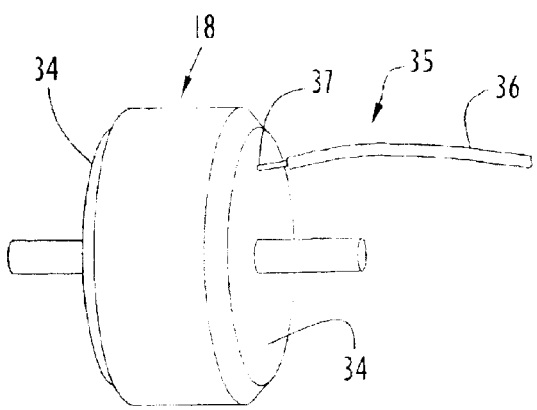
FIG. 5 is a perspective view illustrating testing of a tire prior to use in the air bellows of FIG. 2.

In order to ensure that fires used for air bellows 12 will be air and water tight, the tires 18 should first be tested or screened for leaks. FIG. 5 illustrates one way in which tires 18 may be tested for leaks prior to use in air bellows 12. A tire 18 is positioned between circular plates 34, each having a circumferential outer edge mating with a respective inner side edge of tire 18 to form an air tight seal with the tire. An inflation device 35 is used to inflate the interior of the tire 18 with fluid to a predetermined test pressure. Various fluids can be utilized to test tires 18, but air will typically be used as a test fluid. The inflation device 35 will typically include a conduit or hose 36 having a first end coupled with a source of the fluid (not shown) and a second end carrying or forming a nozzle 37 for supplying the fluid to the interior of the tire 18. The nozzle 37 can be designed in a conventional manner to supply air to the tire interior through a conventional air valve in one of the plates 34. Once inflated to the test pressure, the tire 18 is monitored for leaks in a conventional manner for a sufficient period of time. Tires that evidence leakage are rejected and not used in air bellows 12.

Although the structure formed of interconnected tires 18 is specifically disclosed herein for use as an air bellows in a wave power generator, it should be appreciated that the structure formed of interconnected tires 18 may be filled with a compressible material to present a cushioning structure, i.e., a force or impact-absorbing structure, having many beneficial uses in various other applications including highway crash protection, shock absorption, dock flotation and bumpers, particularly bumpers for ships. The cushioning structure formed by interconnected tires 18 is filled with air, but could be filled with various other compressible materials including fluids and sand. In the area of highway crash protection, elongate tire structures filled with sand can be used as crash protection barriers, for example. Elongate tire structures containing fluids such as gases or liquids may be used to cushion or absorb forces in various settings or environments.

In the wave power generator 10, the air bellows 12 formed by interconnected tires 18 is positioned vertically in the ocean or other body of water 15 which produces significant wave action. As used herein, the term "ocean" is intended to encompass any body of water which presents waves of sufficient height to produce a mechanical effect that can be converted to electrical power. A closed lower end of air bellows 12 is disposed under water and is constrained against vertical movement. Typically, the lower end of air bellows 12 is constrained against vertical movement by adding weight, surface area and/or mass to the lower end. As shown in FIG. 1, a baffle 38, typically formed as a baffle plate is connected to the lower end of air bellows 12 at an air and water tight junction such that the internal channel 20 is closed off and sealed by the baffle plate. The baffle plate is planar and is disposed perpendicular to a central longitudinal axis of air bellows 12. The baffle plate has a perimeter larger than the external circumference of air bellows 12 so that the lower end of air bellows 12 is contained within the perimeter of the baffle plate. Preferably, the lower end of air bellows 12 is centered relative to the baffle plate to enhance balance and stability. The baffle plate is shown as having a circular perimetrical configuration but could have various other perimetrical configurations. The baffle plate presents a relatively large surface area in a plane perpendicular to the central longitudinal axis of air bellows 12 and thusly impedes the lower end of the air bellows from moving vertically in the water even though the air bellows is buoyant. In addition, the baffle plate is made from a weighty material and/or is provided with weights to counteract vertical movement of flotation member 14 and maintain the lower end of the air bellows 12 a sufficient depth within the water as explained further below. Also, the lower end of air bellows 12 may be constrained from vertical upward movement via an anchor line or tether 39 having a first end connected to the wave power generator 10 and a second end connected to an anchor (not shown). In FIG. 1, the anchor line 39 is connected to baffle 38, the anchor line and anchor serving to establish and maintain the position of the wave power generator 10 in the ocean or other body of water 15.

Flotation member 14 is a hollow buoyant member with a bottom connected to the upper end of air bellows 12 at an air and water tight junction and a top formed or provided with a port 40 establishing communication between the atmosphere and the channel 20 of air bellows 12. The flotation member 14 encloses an interior 41 in communication with the channel 20 at the bottom of the flotation member and in communication with the atmosphere via the port 40 at the top of the flotation member. The port 40 can be established in or on the flotation member in various ways. The port 40 for flotation member 14 is defined by the lumen of a tubular extension 42 of flotation member 14, the extension 42 protruding upwardly from a body of the flotation member 14. A lower end of the extension 42 is connected to the body of the flotation member with the lumen of the extension in communication with the interior 41. An upper end of the extension 42 terminates at an opening in communication with the atmosphere. The extension 42 is coaxial with a central longitudinal axis of the body of the flotation member 14, and the flotation member 14 is coaxial with the air bellows 12 for enhanced balance and stability. The channel 20 of air bellows 12, the interior 41 of the flotation member 14 and the port 40 together define a continuous airflow passage closed at the bottom by baffle 38 and open at the top via port 40.

An external water deflector 43 can be disposed over the opening at the upper end of the extension 42 to deter or prevent the entry of rain and/or ocean water. The external water deflector 43 can be designed in various ways but is shown as a cap having a hole at its top aligned with the opening of extension 42 and a skirt flaring outwardly and downwardly from the hole. The skirt deflects water away from the hole, which communicates with and forms part of the airflow passage, so that water is deterred from entering the airflow passage. Since the wave power generator 10 will operate most efficiently when the airflow passage is filled entirely with air, it is desirable for the flotation member 14 to include an internal water deflector and drain holes to keep rain and ocean water from accumulating in the airflow passage as described below for wave power generator 110. Of course, entry of ocean water through port 40 may also be prevented or deterred by making the flotation member 14 of sufficient length so that the opening into port 40 from the atmosphere is disposed sufficiently above the surface of the ocean so that water from waves would rarely, if ever, enter port 40.

When the air bellows 12 is disposed vertically in the body of water 15 with its lower end constrained at the appropriate depth, the flotation member 14 is disposed at the surface of the water 15 and rises and falls therewith in response to wave action as shown by an arrow in FIG. 1. The opening at the upper end of extension 42 remains a sufficient distance above the surface of the water 15 such that the airflow passage is filled entirely or substantially entirely with air and remains in communication with the atmosphere as the flotation member 14 rises and falls. The flotation member 14 and the upper end of air bellows 12 to which it is connected move vertically upwardly and downwardly relative to the lower end of the air bellows which is constrained against vertical movement. Movement of the flotation member 14 upwardly with a crest or peak of a wave causes longitudinal or axial expansion or extension of air bellows 12 since the upper end of the air bellows moves upwardly relative to and further away from the lower end thereof. Longitudinal extension of air bellows 12 creates a vacuum in the airflow passage, causing atmospheric air to flow into the airflow passage via the opening at the upper end of extension 42. Movement of flotation member 14 downwardly with a trough of a wave causes longitudinal or axial retraction, compression, collapse or contraction of air bellows 12 since the upper end of the air bellows moves downwardly relative to and closer to the lower end of the air bellows. Longitudinal retraction of air bellows 12 creates compression In the airflow passage, causing air to flow out of the airflow passage via the opening at the upper end of extension 42.

In order to increase compression when the wave peak passes and the flotation member 14 begins to drop, some weight or ballast in the flotation member 14 may be advantageous. As an example, FIG. 1 illustrates weight or ballast 17 in the interior 41 at the bottom of flotation member 14, the ballast 17 adding weight to the bottom of the flotation member so that the flotation member drops with greater force or momentum. To further accentuate the downward motion of flotation member 14 in response to the wave action, the bottom of the flotation member preferably has an inward taper presenting a streamlined shape which promotes sinkage or dropping of the flotation member into the troughs of the waves. As shown in FIG. 1, the bottom of flotation member 14 tapers inwardly to the upper end of air bellows 12 thusly presently a configuration that increases the distance that the flotation member drops or falls. Furthermore, the flotation member 14 should be sufficiently wide to capture the lifting force of as much of a wave as possible when the flotation member rises. In order to avoid excessive rocking of the flotation member 14 due to the flotation member attempting to align itself with the surface of the water, which could cause the air bellows 12 to buckle in compression, the length of the flotation member 14 is preferably at least twice the width of the flotation member. The flotation member 14 may be provided with vanes or any other stabilizing structure for maintaining or assisting to maintain the flotation member and/or air bellows in a vertical orientation as described below for wave power generator 210. The flotation member 14 could be designed with a T-shaped or cross-shaped configuration formed by a hollow vertical member having a bottom connected with the upper end of air bellows 12 and a horizontal member perpendicular to the vertical member. A T-shaped or cross-shaped flotation member is advantageous in that the horizontal member would provide greater lifting area while the tendency of the flotation member to rock excessively would be inhibited.

The wave power generator 10, and particularly the flotation member 14, may be provided with various accessories including visual markers or indicators, lights, horns, bells, data collection devices and/or data transmittal devices. The data collection devices may be used to collect and record data such as performance characteristics of the wave power generator 10, atmospheric conditions and/or sea conditions. The data transmittal devices may be used to transmit collected and/or recorded data to one or more remote monitoring stations. Data obtained from the wave power generator 10 at the one or more monitoring stations may be used to track generator performance and/or to forecast weather, for example.

The turbine generator 16 is mounted within the interior 41 of flotation member 14, but could be mounted at other suitable locations within the airflow passage. The turbine generator 16 for wave power generator 10 is disposed in the airflow passage between ballast 17 and port 40. The turbine generator 16 is a conventional turbine generator typically including a plurality of turbine blades 44 rotated by air flow, an output shaft (not shown) rotated in response to rotation of blades 44, and a generator unit (not shown) for converting mechanical motion of the output shaft into electrical power. The output shaft and generator unit may be enclosed in a housing 45 as shown for the turbine generator 16. Supports 46 may be provided in the interior 41 of flotation member 14 to mount, support and/or center the turbine generator 16 in the air flow passage as described in greater detail for supports 146 of wave power generator 110. The turbine generator 16 is mounted in the airflow passage with its longitudinal axis coaxial with the flotation member 14 such that the turbine blades 44 are directly in the path of air flow into and out of the airflow passage and are rotated or turned by air flowing through the airflow passage. The turbine blades 44 of turbine generator 16 should rotate or turn in the same direction when air is flowing into and out of the airflow passage. Accordingly, generator 16 is characterized by self-rectifying turbine blades, i.e., turbine blades that rotate in the same direction regardless of which direction (in or out) the air passes over the blades, and the turbine generator 16 may be a Wells turbine generator. Alternatively, the turbine blades 44 may be designed to pivot, as described below for turbine blades 144, to obtain self-rectification of the turbine blades.

When the air bellows 12 is extended in response to wave action as described above, air flows in the airflow passage in an "air in" direction and causes rotation of turbine blades 44 in a rotational direction. When the air bellows 12 is contracted in response to wave action as discussed above, air flows in the airflow passage in an "air out" direction and causes rotation of turbine blades 44 in the same rotational direction. Accordingly, the turbine blades 44 rotate in the same rotational direction for air flowing in the "air in" and "air out" directions as further represented by the pivotal blades shown in FIG. 7. Rotation of turbine blades 44 in response to the flow of air in the airflow passage causes rotation of the output shaft (not shown), and mechanical rotation of the output shaft is converted to electrical power by the generator unit (not shown). Electrical power is thusly produced by the turbine generator 16 when air is flowing into and out of the airflow passage, thereby maximizing efficiency.

Electrical power produced by the wave power generator 10 may be transmitted to one or more remote locations via one or more electrical transmission lines br cables 48 coupled with turbine generator 16 and extending from wave power generator 10 to the one or more remote locations. A single electrical transmission cable 48 is shown as exiting the wave power generator 10 via an opening in the baffle 38 forming a seal with the electrical transmission cable 48 to prevent the entry of water into the airflow passage. The electrical transmission cable 48 thusly extends through the air bellows 12 and is of sufficient length within air bellows 12 so as not to interfere with expansion and contraction of the air bellows in response to wave action. Of course, the one or more electrical transmission cables can exit the wave power generator 10 at any other suitable location or locations. As shown in FIG. 1, the electrical transmission cable 48 can be resiliently wound or coiled within the air bellows 12 or at any other suitable location or locations to permit the cable to resiliently expand and contract to accommodate expansion and contraction of air bellows 12. The electrical cable 48 may be shielded or encased for increased strength and resistance to breakage from various impacts or forces including shark and whale bites. The electrical transmission cable 48 can transmit the electrical power produced by wave power generator 10 to various remote locations located on-shore, near-shore, off-shore and under water. The electrical transmission cable 48 can be used to supply electrical power to a deep water hydrogen generator as explained further below. It may be desirable that the electrical transmission cable 48 and the anchor line 39 are combined if both cables lead down to the hydrogen generator.

Although wave power generator 10 is illustrated with a single resilient structure for air bellows 12, it should be appreciated that a plurality of resilient structures or air bellows 12, typically three or four, can be bundled together in parallel vertical relationship for enhanced structural integrity and increased air volume. A wave power generator incorporating a plurality of resilient structures or air bellows 12 may include a single flotation member 14 or a plurality of flotation members and may include a single turbine generator 16 or a plurality of turbine generators.

Figure 6:
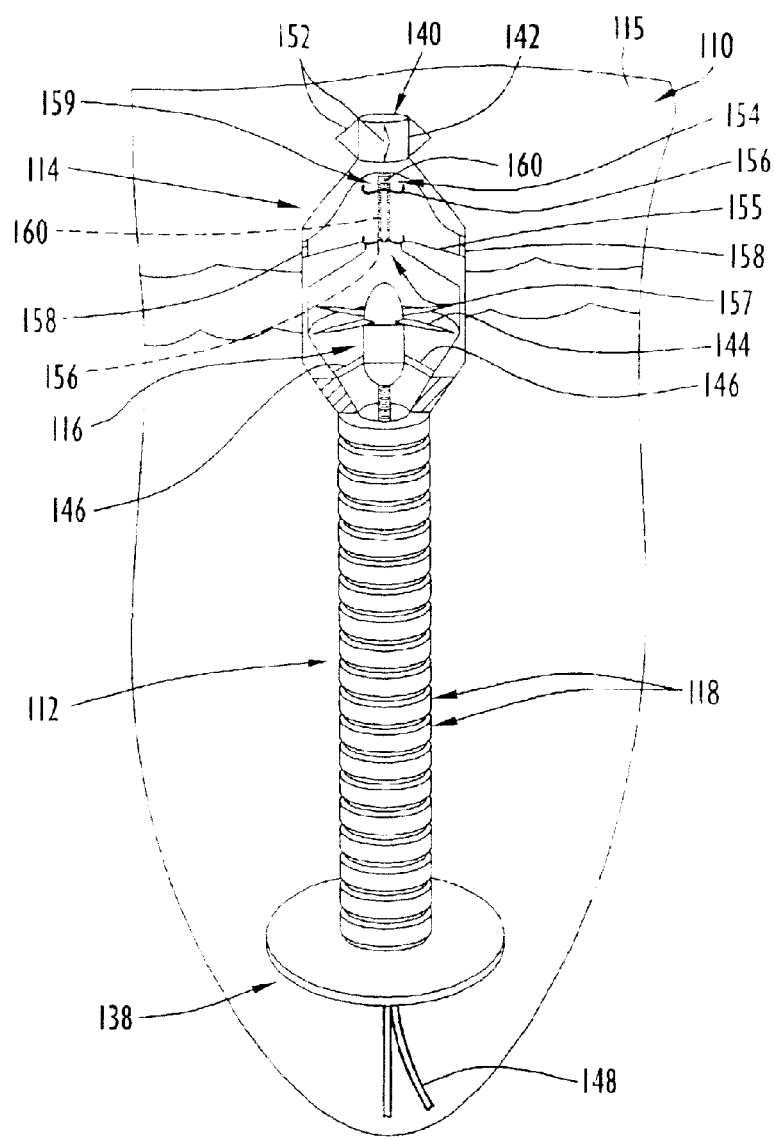
FIG. 6 is a broken perspective view, partly in section, of an alternative wave power generator in accordance with the present invention.

An alternative wave power generator according to the present invention is illustrated at 110 in FIG. 6. Wave power generator 110 is similar to wave power generator 10 and includes air bellows 112 formed by a plurality of interconnected tires 118, flotation member 114 connected to an upper end of air bellows 112, baffle 138 connected to a lower end of air bellows 112, and turbine generator 116 disposed within flotation member 114. The electrical transmission cable 148 for wave power generator 110 is similar to electrical transmission cable 48, and a length segment of cable 148 disposed within the airflow passage is resiliently pre-wound or pre-coiled to permit coiling and uncoiling of cable 148 for corresponding length adjustment as the air bellows 112 expands and contracts in length. Flotation member 114 is similar to flotation member 14 except that port 140 for flotation member 114 is formed by a shorter and wider tubular extension 142. The tubular extension 142 is provided with a radar reflector comprising a plurality of external radar reflecting fins 152. Fins 152 are equally spaced about a central longitudinal axis of extension 142 and are of triangular configuration extending radially from extension 142. One or more supports 146 are disposed in the interior of flotation member 114 and extend from an external wall of the flotation member to the turbine generator 116. The supports 146 provide structural support for the turbine generator 116 and center the turbine generator 116 in the airflow passage of the wave power generator 110. However, the supports 146 do not appreciably obstruct the flow of air in the airflow passage.

The wave power generator 110 operates in the same manner as described above for wave power generator 10. In addition, wave power generator 110 includes an internal water deflector 154 to prevent rain or water from waves from accumulating in the airflow passage. The internal water deflector 154 is disposed within an upper portion of the interior of flotation member 114 and includes a skirt 155 and a cap 156 disposed above the skirt 155. The skirt 155 has a conical shape with a lower edge continuously connected with and forming a seal with the external wall of flotation member 114. Skirt 155 has an upper edge circumscribing an aperture 157 axially aligned with the airflow passage and forming part of the airflow passage. A plurality of drain or weep holes 158 are formed through the external wall of flotation member 114 adjacent the lower edge of skirt 155, the drain holes 158 being disposed in line with or substantially in line with the inclined top surface of skirt 155. The cap 156 is disposed over the aperture 157 in axial alignment therewith and has a dome-shaped central portion joined to an upwardly turned or curving outer rim. The upwardly turned rim defines a water collection pocket 159 along a top side of cap 156 at the base of the dome-shaped central portion. The cap 156 is connected to and suspended from a bias member 160 normally biasing or maintaining the cap 156 in an inoperative position wherein the cap is spaced above aperture 157 as shown in solid lines in FIG. 6. The bias member 160 is shown as a coil spring but may include any other member or members capable of maintaining the cap 156 in the inoperative position, allowing the cap to move to an operative position in response to a predetermined weight of water on the cap, and automatically returning the cap to the inoperative position when the weight of water is removed as explained further below.

The aperture 157 is uncovered by cap 156 in the inoperative position, and air is free to flow around and past the cap in the inoperative position such that air is free to flow into and out of the airflow passage. Supports, similar to supports 146, or any other suitable structure may be provided in the flotation member 114 for mounting the bias member 160 in line with the aperture 157 while still permitting air to flow in the airflow passage. In the event that water enters the port 140, the water will be collected in pocket 159 as facilitated by the top side of the cap presenting a cross-sectional configuration and size larger than the cross-sectional configuration and size of port 140 and aperture 157. As the pocket 159 becomes filled with water, the weight of the water on the top side of cap 156 overcomes the biasing force of the bias member 160 and causes the cap to move downwardly to an operative position wherein the cap is seated on skirt 155 to close off aperture 157 as shown in dotted lines in FIG. 6. Water that flows over or past the cap 156 is deflected by the inclined top surface of skirt 155 to drain holes 158, and the water is discharged from the flotation member 114 via the drain holes such that water does not enter a lower portion of the flotation member. When the entry of water into flotation member 114 has ceased sufficiently so that the biasing force of bias member 160 is no longer overcome by the weight of water on the top side of cap 156, the cap is automatically returned to the inoperative position by the bias member 160 and operation of the wave power generator 110 will automatically resume. It should be appreciated that the internal water deflector 154 can be designed to close off the aperture 157 instantaneously when a significant amount of water rushes into the flotation member as would occur, for example, if the flotation member was submerged by a wave or due to being run over by a sea going vessel.

Figure 7:
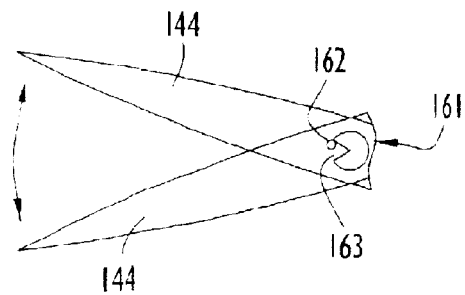
FIG. 7 is a broken plan view illustrating a pair of turbine blades for the wave power generator of FIG. 6.

The turbine generator 116 of wave power generator 110 includes alternative self-rectifying turbine blades 144, best shown in FIG. 7. Pairs of turbine blades 144 are pivotally connected to one another; and, when a plurality of pairs of turbine blades 144 are arranged about the longitudinal axis of turbine generator 116, the turbine blades 144 rotate in the same rotational direction for air flowing in the airflow passage in the "air in" and "air out" directions. The turbine blades 144 are pivotally connected in pairs at their inner ends, and the turbine blades 144 pivot about the pivotal connection at their inner ends. In particular, the turbine blades 144 pivot, as shown by an arrow in FIG. 7, between a first position in which the turbine blades 144 are in overlapping alignment and a second position, shown in FIG. 7, in which the turbine blades 144 are separated and define an angle with one another. A stop 161 including a pin 162 engaging in a notch 163 is provided to limit and control relative pivotal movement of the turbine blades 144 and to prevent over rotation thereof. When air is flowing in the airflow passage in the "air out" direction, the turbine blades 144 will automatically assume the first position and will rotate in a rotational direction. When air is flowing in the airflow passage in the "air in" direction, the turbine blades 144 will automatically assume the second position and will rotate in the same rotational direction. In this manner, the surface configuration or area of the turbine blades 144 is self-adjusting to ensure rotation of the blades 144 in the same rotational direction about the longitudinal axis of the turbine generator for air flow in the "air in" and "air out" directions.

Figure 8:
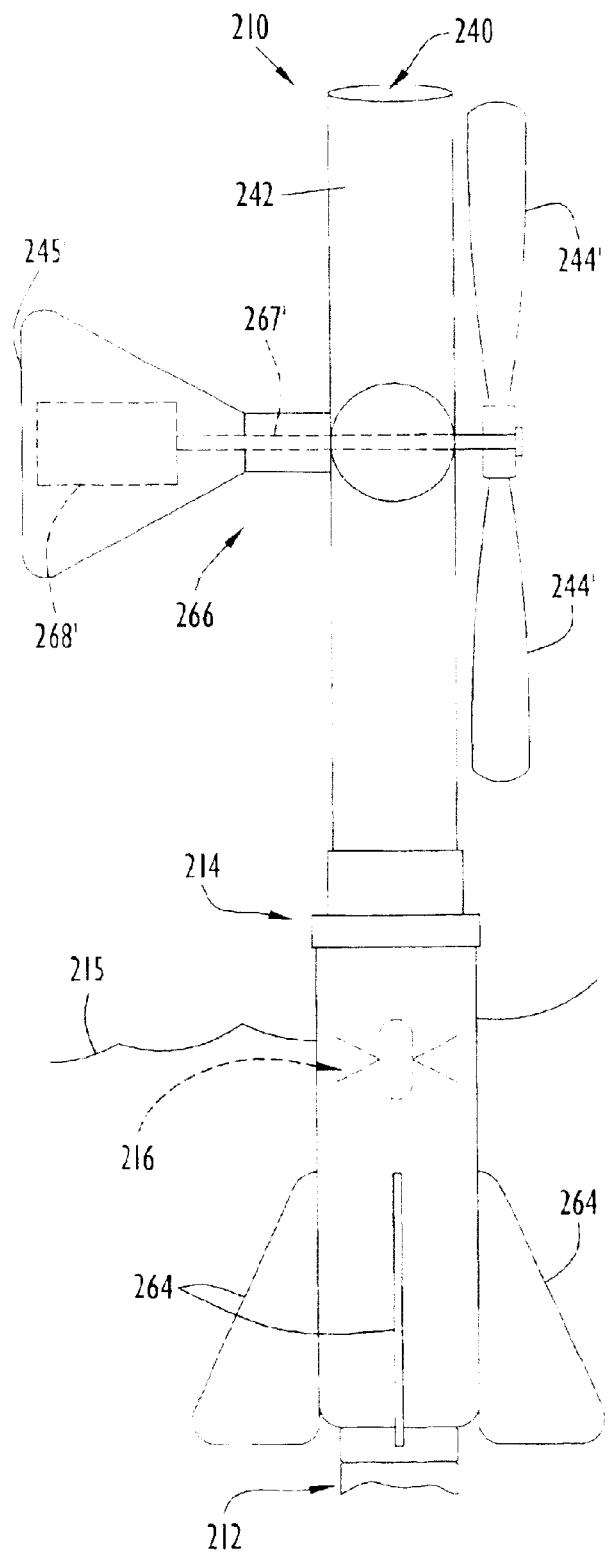
FIG. 8 is a broken side view of a further alternative wave power generator according to the present invention incorporating a wind generator.

Another alternative wave power generator is illustrated in FIG. 8 at 210, the wave power generator 210 being representative of a wave power generator that also incorporates a wind generator. Wave power generator 210 is similar to wave power generator 10 and includes air bellows 212, flotation member 214 and turbine generator 216 disposed within flotation member 214 as described above for the wave power generators 10 and 110. The bottom of flotation member 214 is provided with a plurality of stabilizing vanes 264 to assist in maintaining the vertical orientation of flotation member 214 and air bellows 212 in the water. A tubular extension 242 of flotation member 214 extends upwardly from a tubular body of the flotation member 214 and defines port 240 of the airflow passage. The air bellows 212, the flotation member 214 and the turbine generator 216 of wave power generator 210 operate as described above to convert wave-induced vertical motion of flotation member 214 into electrical power. In addition, a wind generator 266 is mounted on the wave power generator 210, the wind generator 266 being mounted on extension 242.

Wind generator 266 includes an output shaft 267' extending perpendicularly to extension 242 and a plurality of wind turbine blades 244' mounted on output shaft 267'. The wind turbine blades 244' are external to the wave power generator so that they are rotated by atmospheric wind to rotate output shaft 267'. A conventional generator unit 268' is disposed within a housing 245' mounted on extension 242 and is coupled with the output shaft 267'. The generator unit 268' converts mechanical motion of output shaft 267' into electrical power in a conventional manner as described above for the turbine generators. One or more electrical transmission cables (not shown) may run from the generator unit 268' to one or more remote locations as described above for the electrical transmission cables 48 of turbine generator 16. The wave power generator 210 is representative of a combination wave and wind power generator in which the wind generator has its own generator unit, separate from the turbine generator of the wave power generator.

Figure 9:
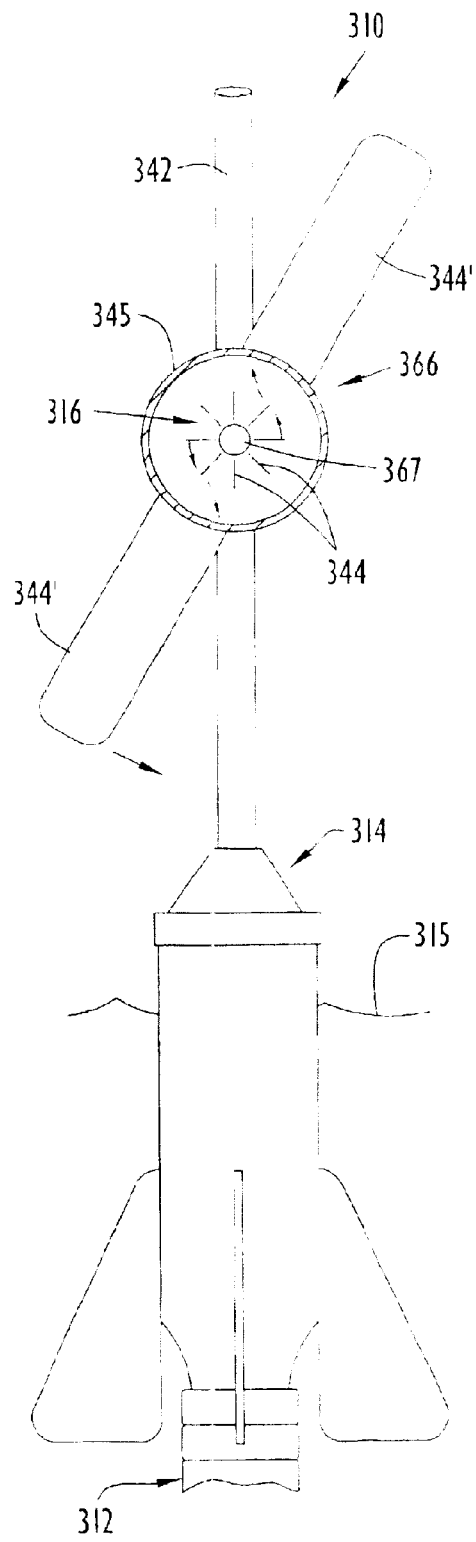
FIG. 9 is a broken rear view, partly in section, of another alternative wave power generator according to the present invention incorporating a wind generator.

In the wave power generator 310 shown in FIG. 9, the wave power generator and the wind turbine blades of the wind generator drive the same turbine generator. The wave power generator 310 is similar to the wave power generator 210 except that the wind turbine blades 344' of wind generator 366 are mounted to an output shaft (not shown) which is coupled to the output shaft 367 for turbine generator 316. The turbine generator 316, which is contained in a housing or enclosure 345 mounted on or formed by extension 342 of flotation member 314, includes a plurality of turbine blades 344 disposed in the airflow passage. When air flows into and out of the airflow passage in the "air in" and "air out" directions shown by the arrows in FIG. 9, the turbine blades 344 effect rotation of the output shaft 367 in a rotational direction, i.e. counterclockwise. Air flows into and out of the airflow passage in response to expansion and contraction of air bellows 312 as described above. In addition, the output shaft 367 is rotated in response to rotation of the wind turbine blades 344'. Mechanical rotation of output shaft 367 is converted to electrical power by the generator unit (not shown) of turbine generator 316. The output shaft of the wind generator 366 is coupled to the output shaft 367 via a shaft disconnect mechanism so that the turbine generator 316 does not exert force attempting to rotate the output shaft of the wind generator 366 when wave action is present without wind.

The wave power generators 210 and 310 which incorporate wind generators would typically be employed in coastal applications where the electricity produced would be directly transmitted to on-shore locations. The lower ends of the air bellows 212, 312 would typically be mounted at a depth less than one hundred feet. The baffles at the lower ends of the air bellows 212, 312 could comprise concrete pads support directly upon the bottom surface or floor of the ocean or other body of water. The wind generators 266, 366 will preferably be mounted via a swivel connector to allow the wind generators to self-orient to face into the wind for maximum efficiency.

Figure 10:
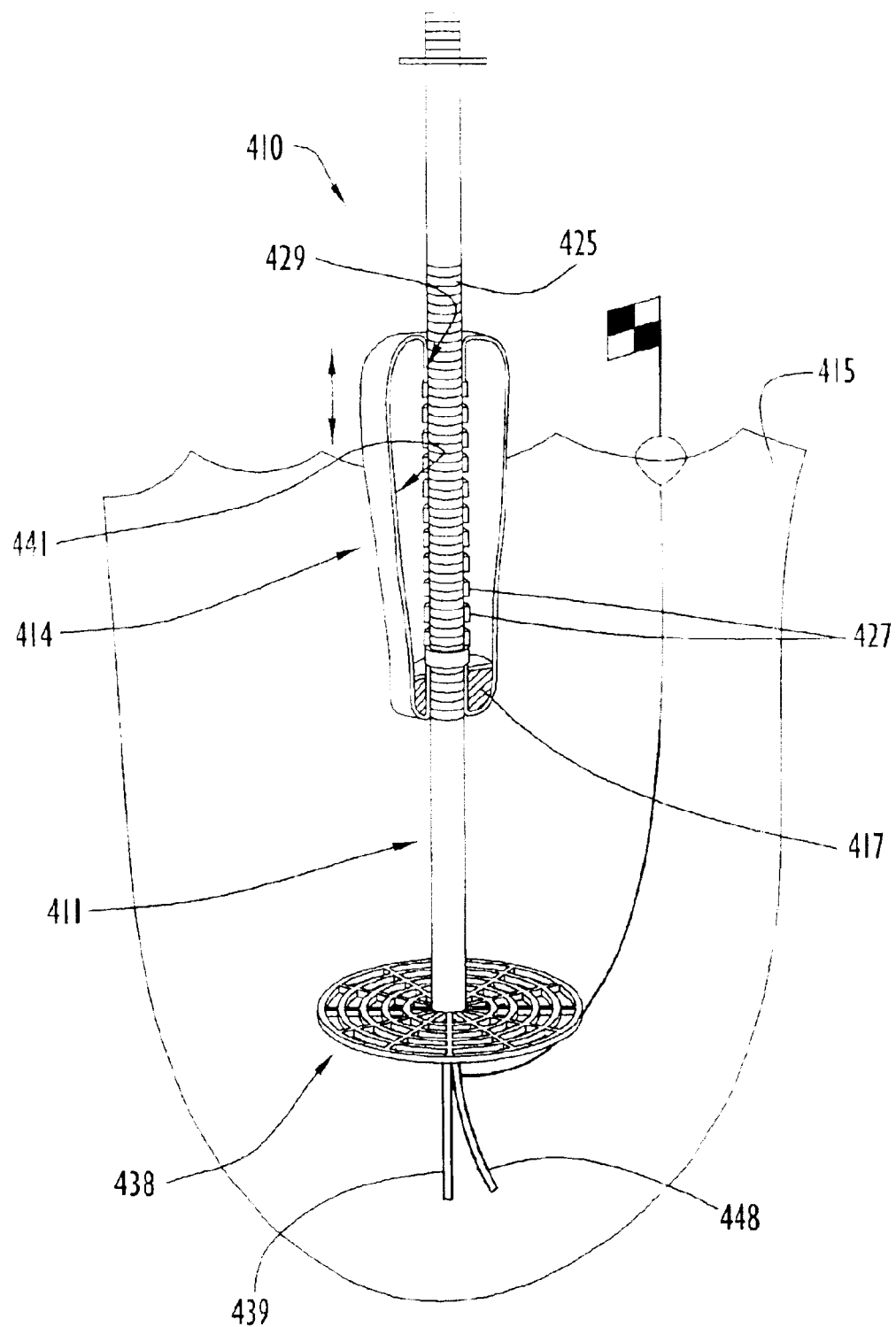
FIG. 10 is a broken perspective view, partly in section, of an additional wave power generator according to the present invention.

An additional and preferred wave power generator according to the present invention is illustrated in FIG. 10 at 410 and is representative of a wave power generator that incorporates a linear electric generator. Wave power generator 410 includes an inner elongate member 411, an outer flotation member 414 disposed on and/or alongside the inner member 411, a coil 425 carried by or forming at least a portion of inner member 411 and one or more magnets 427 carried by outer flotation member 414. The inner member 411 will typically be an elongate tubular member of greater length than width with a buoyant upper end and a lower end that is constrained against vertical movement when the wave power generator 410 is deployed in the ocean or other body of water with the inner member 411 oriented vertically as shown in FIG. 10. The lower end of inner member 411 is constrained against vertical movement by ballast (not shown) in the lower end and by a baffle 438. Typically, the inner member 411 is about one hundred feet to one hundred fifty feet long depending on wave sizes in the selected location. The coil 425 may be disposed externally over an external wall of the inner member or may form an external wall of the inner member. The coils 425 could be disposed in a recess of the inner member external wall. The coil 425 is of sufficient length so that the one or more magnets 427 is/are moved relative to and along the coil 425 when the outer flotation member 414 moves upwardly and downwardly in response to wave action as described further below. Preferably, the inner member 411 will be constructed as a fiberglass tube wrapped with the coil 425 and overlaid with a thin layer of abrasion-resistant material such as Kevlar laminated with graphite-filled epoxy. The coil 425 may be conventionally constructed from wire as typically utilized for electrical generation.

The outer flotation member 414 is buoyant and has a longitudinal or axial passage 429 therethrough slidably receiving the inner member 411. The outer flotation member 414 moves upwardly and downwardly relative to and along the length of the inner member 411 in response to wave action, with the length of the outer member extending along the length of the inner member, as shown by an arrow in FIG. 10. The outer flotation member 414 is illustrated in FIG. 10 as a hollow elongate member of greater length than width and enclosing an interior 441. The bottom of outer flotation member 414 is provided in its interior 441 with ballast 417 and has a tapered configuration to maximize the vertical drop of the outer flotation member as described above. The outer flotation member 414 is wider at its top to enhance lift and maximize vertical movement of the outer flotation member upwardly and downwardly as also described above. The one or more magnets 427 are provided in or on an internal wall of outer flotation member 414 or may form the internal wall so as to circumscribe or substantially circumscribe the passage 429. The outer flotation member 414 is shown as including a plurality of permanent ring magnets 427 arranged along passage 429 in side-to-side relation. A typical length for the outer flotation member 414 from top to bottom would be twenty to forty feet. The outer flotation member 414 may be constructed of fiberglass, aluminum or foam, with ceramic, rare earth or other permanent magnets.

As the outer flotation member 414 rises and falls in response to wave action, the magnets 427 are moved linearly relative to and along the coil 425 such that electrical power is produced in a known manner. The electrical power may be transmitted to one or more remote locations via one or more electrical transmission cables 448 as described above. The wave power generator 410 will preferably be anchored via an anchor line or tether 439. Again, it is preferable if the electrical transmission cable 448 and the anchor cable 439 are a single, unitary cable. A series or plurality of wave power generators 410 can be chained together at their bottoms to reduce the number of anchor lines needed. The size of the coil and magnet/magnets can be varied in accordance with the electrical power output desired. Although the one or more magnets are moved relative to and along a constrained coil in the wave power generator 410, it should be appreciated that the wave power generators can include linear electrical generators in which the coil is moved vertically relative to and along one or more constrained magnets.

Figure 11:
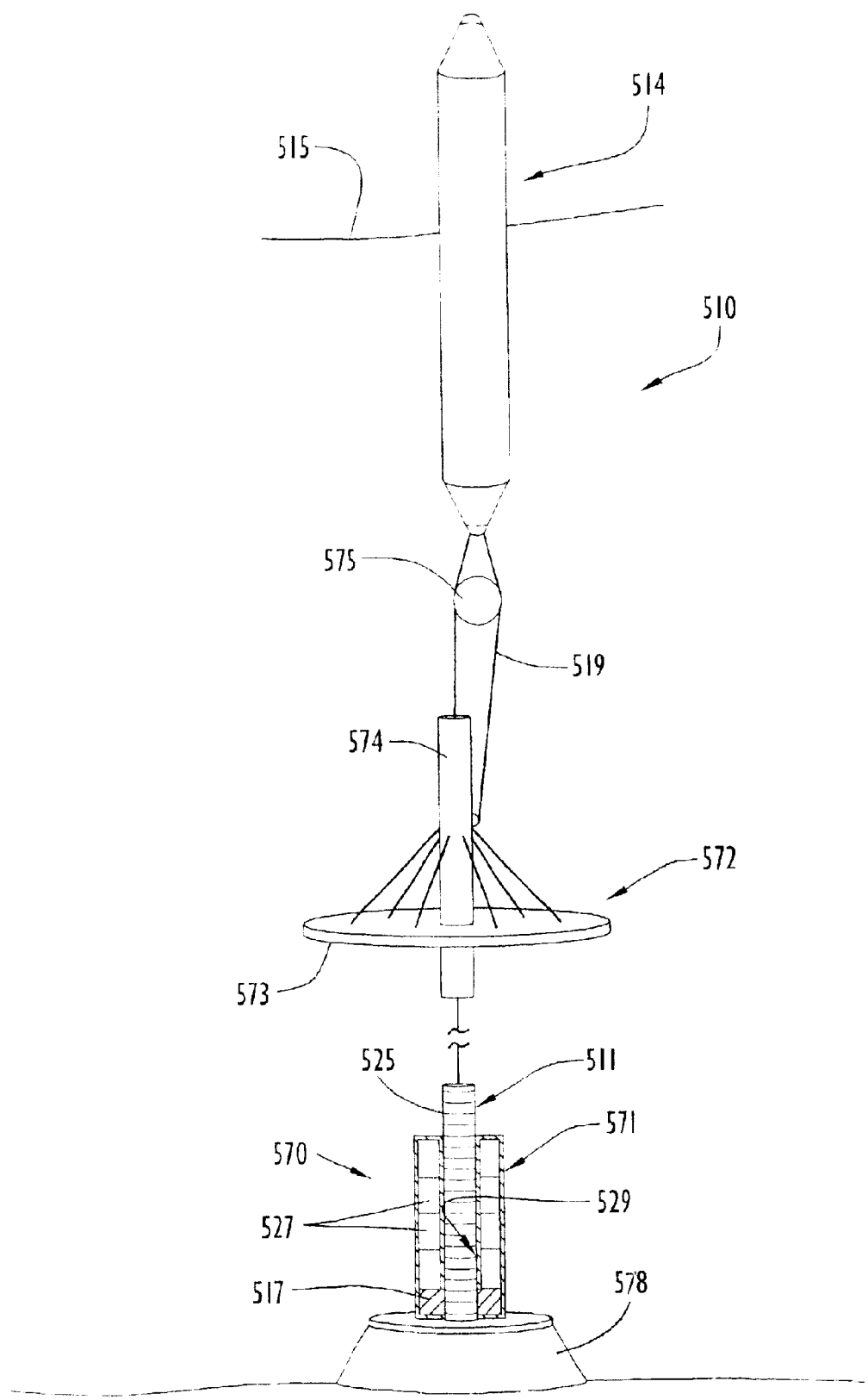
FIG. 11 is a broken perspective view, partly in section, depicting another alternative wave power generator in which a surface flotation member is coupled with an underwater linear electric generator.

Another alternative and particularly preferred wave power generator according to the present invention is illustrated at 510 in FIG. 11. Wave power generator 510 includes an underwater linear electric generator 570 and a wave powered surface flotation member 514 coupled with the linear electric generator 570 via a connecting line 519. The linear electric generator 570 is similar to the linear electric generator of wave power generator 410 but is a self-contained unit disposed entirely underwater, typically at great depths. Also, the linear electric generator 570 is representative of a linear electric generator in which the coil is moved vertically relative to and along one or more constrained magnets. Linear electric generator 570 includes inner elongate member 511 carrying coil 525, similar to inner elongate member 511, and includes an outer member 571 carrying one or more magnets 527. Outer member 571 is anchored to the ocean bottom, the bottom of outer member 571 being provided with ballast 517 and being secured to a non-buoyant foundation, base or pad 578 that rests on the ocean bottom such that the outer member 571 is constrained against vertical movement. A passage 529 is defined through the outer member 571, and a plurality of magnets 527 circumscribe the passage 529. The inner elongate member 511, which is disposed vertically, is slidably disposed in the passage 529 for upward and downward vertical movements relative to the outer member 571. Vertical movement of inner elongate member 511 relative to outer member 571 cause linear movements of coil 525 along and past magnets 527 to produce electricity, which may be transmitted to various remote locations via one or more electrical transmission cables (not shown) as described above. Also, the linear electric generator 570 is particularly useful for supplying electricity to power a deep water hydrogen generator as described in greater detail below.

The flotation member 514 moves the inner member 511 upwardly and downwardly in response to wave action to which the flotation member 514 is subjected at the surface of the water 515. The flotation member 514 is preferably designed as an elongate spar buoy, typically thirty to forty feet long, disposed vertically at the surface of the water. The flotation member 514 is ballasted at its bottom and is provided with a tapered configuration to maximize vertical movements and efficiency by developing greater momentum on both the rising and falling motions to produce greater vertical displacement for a given wave height. The connecting line 519 connects the bottom of the flotation member 514 to the inner elongate member 511 of linear electric generator 570 such that vertical movements of the flotation member 514 are transmitted to the inner elongate member 511 so that the inner elongate member 511 is moved correspondingly with the flotation member 514.

In order to avoid having to precisely fit the length of connecting line 519, a tensioning device 572 may be incorporated in the wave power generator 510. Tensioning device 572 includes a weighted, horizontally oriented baffle plate 573 disposed about fifty feet or more beneath the flotation member 514 and a sleeve 574 extending vertically upwardly and downwardly from a center of the baffle plate 573. The connecting line 519 runs upwardly from the baffle plate 573 to a block 575 of tensioning device 572 secured to the bottom of flotation member 514. The connecting line 519 mins downwardly from the block 575 through sleeve 574 and downwardly to the linear electric generator 570. The tensioning device 572 allows the speed and distance that the connecting line 519 applies to the linear electric generator 570 to be doubled, but with half the force.

Figure 12:
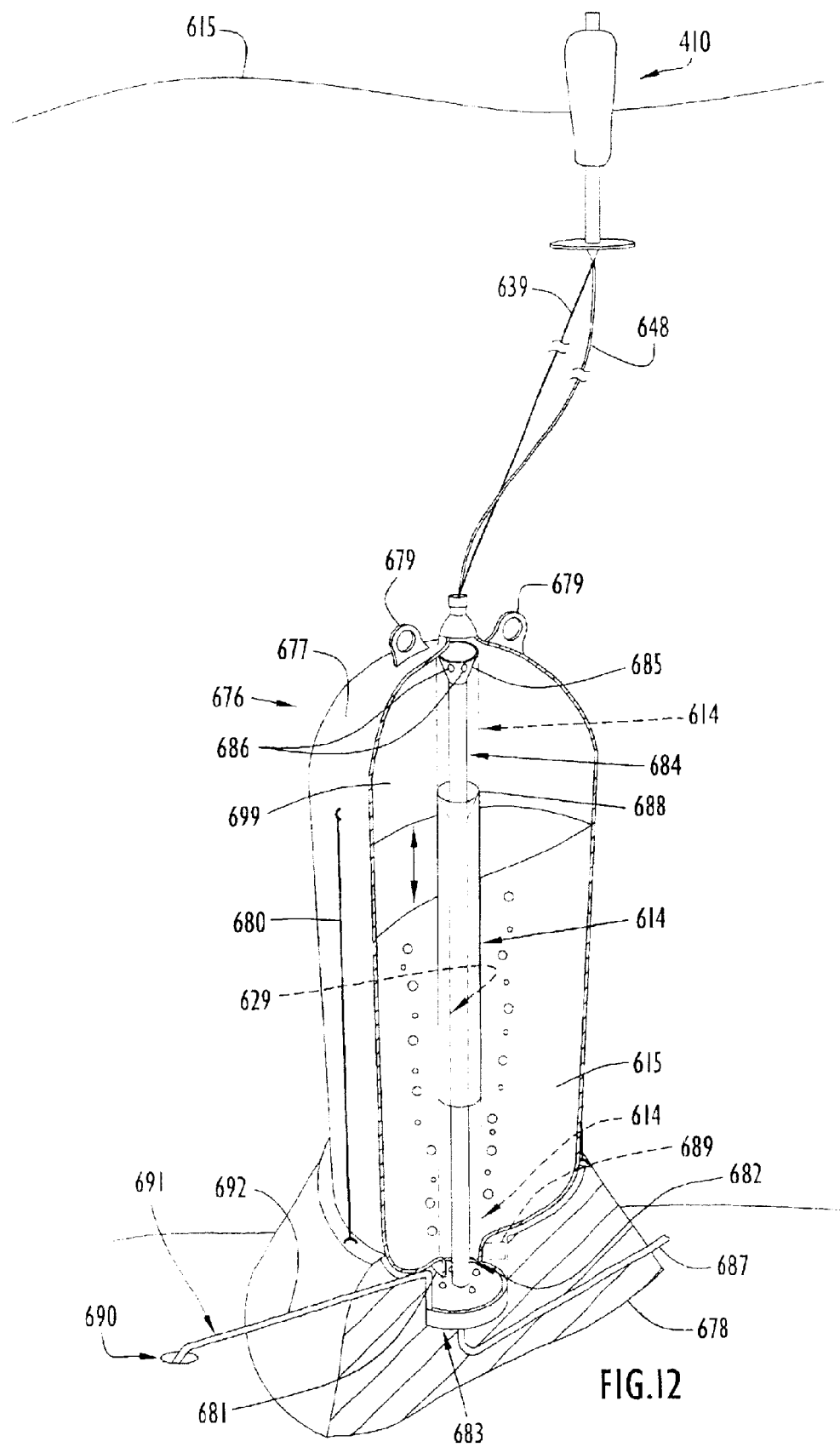
FIG. 12 is a broken perspective view, partly in section, depicting a hydrogen generation system according to the present invention including a deep water hydrogen generator and a wave power generator for powering the hydrogen generator.

FIG. 12 depicts a deep water hydrogen generator 676 according to the present invention for producing hydrogen gas via electrolysis of water. The deep water hydrogen generator 676 includes a transfer chamber 677 having a collection point disposed at great depths under water and an electrolysis unit 683 adjacent the collection point. In the case of hydrogen generator 676, the transfer chamber 677 includes a tank or vessel disposed at great depths under water, and the collection point is defined by the lower end of tank 677 as described further below. It should be appreciated, however, that the transfer chamber 677 may be a hose, a conduit or any other chamber into which compressed hydrogen gas is directed. Where the transfer chamber is a hose or conduit, the collection point may be defined by an end of the hose or conduit adjacent the electrolysis unit. The vessel 677 is typically supported on a foundation, base or pad 678 that rests on the bottom surface or floor of a deep body of water 615 such as the ocean or deep wells. Electrical power is supplied to the hydrogen generator 676 from an electrical power source via an electrical transmission cable 648. The electrical power supplied via the electrical transmission cable 648 may be produced or obtained in any manner, and the electrical power source may include wind, solar, wave, fossil fuel, direct current and alternating current sources. The electrical power supplied to the hydrogen generator 676 can be generated on-shore, near-shore or off-shore. In the deep water hydrogen generator 676, the electrical power source is depicted as the wave power generator 410. Another representative electrical power source is the wave power generator 510 or any of the other wave power generators of the present invention. Together, the deep water hydrogen generator 676 and the electric power source, i.e., wave power generator 410 in FIG. 12, comprises a deep water hydrogen generation system.

The tank 677 may be made of composite materials such as fiberglass and carbon fiber. The tank 677 may be about 10 to 15 meters long and about 3 to 5 meters wide. The tank 677 may have an elongate cylindrical configuration with one or more external lifting elements 679, shown as a pair of eyelets at the top of the tank, for being engaged with a connecting line, an anchor line or any other line or other structure by which the tank may be lowered to and raised from a great depth in body of water 615. Of course, the anchor line 639 and/or the electrical transmission cable 648 may be used to hoist the tank 677 for raising and lowering. The tank 677 may be fitted with one or more conventional pressure-sensitive valves for retaining high pressure gas inside the tank. The tank 677 may be removable from the foundation 678, which will typically be a cast concrete pad supporting the tank in a vertical orientation. Tethers 680 may be connected to tank 677 and foundation 678 to maintain the proper position of the tank on the foundation and to prevent vertical lift of the tank when filled with hydrogen gas.

The lower end of tank 677 defines the collection point and includes a neck 681 forming or provided with an inlet 682 through which water 615 enters the interior of tank 677. An electrolysis unit 683 is mounted beneath the lower end of tank 677 adjacent thereto. The electrolysis unit 683 is shown in FIG. 12 as being mounted just below neck 681 and as being disposed within a recess formed in the foundation 678. However, it should be appreciated that the electrolysis unit 683 can be mounted at various locations depending on the location of the collection point. A tubular transport member 684 extends vertically upwardly in the interior of tank 677 from the electrolysis unit 683 to an upper end 685 disposed at or near the top of tank 677. The upper end 685 has an external surface with a conical or flared configuration, and a plurality of inlet holes 686 are provided in the upper end 685 by which hydrogen gas in the interior of tank 677 enters a transport channel defined by the lumen of the transport member 684. The transport channel is coupled to and in communication with a transport line or pipe 687 extending from the hydrogen generator 676. The transport pipe 687 is shown as extending from the electrolysis unit 683 to exit the hydrogen generator 676 through foundation 678. However, the transport pipe 687 can be disposed at various locations. The transport pipe 687 extends from hydrogen generator 686 to a remote location, which may constitute by way of example a storage facility or power plant, located on-shore, near-shore, off-shore or underwater. A suitable valve or valves at the remote location may be used to extract hydrogen gas from transport pipe 687 and, therefore, from tank 677.

An outer flotation member 614 is slidably disposed on the transport member 684 and includes a longitudinal or axial passage 629 through which the transport member extends. An upper end 688 of the outer flotation member 614 has an internal surface to mate with the external surface of the upper end 685 of transport member 684. A lower end of the outer flotation member 614 may be ballasted. The outer floatation member 614 moves upwardly and downwardly relative to and along the transport member 684 in accordance with the level of water within tank 67 as explained further below. As also explained further below, the upper end 685 of transport member 684 and the upper end 688 of flotation member 614 form a valve or seal for the transport channel while the lower end of flotation member 614 cooperates with the lower end of tank 677 to form a valve or seal for inlet 682. Of course, the tank 677 could be provided with the upper and lower valves described below for hydrogen generator 776.

The electrolysis unit 683 may be a conventional electrolysis unit that uses electricity to separate water into hydrogen gas and oxygen. By passing an electric current through water between two electrodes, hydrogen gas is generated at the negative electrode and oxygen is generated at the positive electrode. The electrodes and related components are typically housed in a unit or package having connections for the sources of electricity. Of course, the electrical transmission cable 648 supplying electrical power from wave power generator 410 can be coupled with the hydrogen generator 676 at various locations and in various ways depending upon the electrical connection with the electrolysis unit 683. It is known to use platinum coated tantalum electrodes for electrolysis of salt water, and these or other suitable electrodes may be used in electrolysis unit 683. Particularly where the hydrogen generator 676 is deployed in fresh water lakes or wells, less complex and less expensive electrodes may be used.

In order to avoid crushing and excessive compressive force on the tank 677, the tank 677 will typically be filled or will become filled with water as it is lowered to a great depth in body of water 615. Preferably, the hydrogen generator 676 will be deployed at the greatest feasible depth. A depth of one thousand feet or more is desirable, with greater depths corresponding to greater efficiencies. The tank 677 will initially be filled with water upon being deployed at the great depth, and the outer flotation member 614 will be in a raised or upper position shown in dotted lines in FIG. 12. In the raised or upper position for outer flotation member 614, the upper end 688 of the outer flotation member mates with the upper end 685 of transport member 684 to form a closed valve which closes off and seals the inlet holes 686 such that water cannot enter the transport channel. The transport pipe 687 is thusly prevented from becoming undesirably fouled with water. Electrical power is supplied via electrical transmission cable 648 to electrolysis unit 683. Since the hydrogen generator 676 is disposed a great depth underwater, it is preferred that the electrical transmission cable 648 constitute a shielded or encased power cord that is resistant to shark and whale bites. The electrolysis unit 683 uses the electricity supplied via the electrical transmission cable 648 to separate the water 615 in tank 677 into hydrogen gas and oxygen. As the water is electrolyzed, the hydrogen gas 699 produced therefrom is highly compressed or pressurized as a natural consequence of the hydrogen generator 676 being disposed a great depth underwater. The compressed hydrogen gas is directed into the transfer chamber 677 at the collection point, and the relatively lighter hydrogen gas 699 rises to the top of tank 677 as the level of water 615 in the tank 677 proceeds to fall as electrolysis continues. The outer flotation member 614 drops correspondingly with the water level in tank 677, and the internal surface of upper end 688 is disengaged from mating engagement with the external surface of upper end 686 to form an open valve in which the inlet holes 686 are open so that the hydrogen gas can enter the transport member 684 and can be withdrawn via the transport channel and the transport pipe 687. Once the water level in tank 677 has dropped sufficiently so that the tank 677 is filled or substantially filled with hydrogen gas, the lower end of outer flotation member 614 engages the lower end of tank 677 to form a closed valve in which the inlet 682 is closed off and sealed in a lowered or downward position for the (outer flotation member shown in dotted lines in FIG. 12. Water is thusly prevented from entering the tank 677 through the inlet 682 until some of the hydrogen gas has been withdrawn.

When hydrogen gas is thereafter withdrawn from tank 677, the outer flotation member 614 moves upwardly from its downward position so that the lower end of flotation member 614 is disengaged from the lower end of tank 677.

In this position, the valve formed by the lower end of the flotation member 614 and the lower end of the tank 677 is open and the inlet 682 is open so that water enters the tank via inlet 682. Water continues to enter the tank 677 as hydrogen gas is bled off or withdrawn, and the outer flotation member 614 will move to its upward position to close off the transport channel when the water level becomes sufficiently high. Newly entered water in tank 677 is electrolyzed by the electrolysis unit 683 to produce additional hydrogen gas, and the process is continued. Oxygen generated as a result of the electrolysis may or may not be collected and can merely be vented. By generating hydrogen gas at great underwater depths, the hydrogen is already pressurized without the need for additional power consumption and inefficiencies. Great underwater depths will typically be found in the ocean, but may also be found in other bodies of water, including deep wells. Given that salt water has various impurities, hydrogen gas produced from salt water will not be entirely pure since chlorine and other gases will be present. Impurities can be removed, if necessary, from the hydrogen gas at shore-based facilities.

The efficiency of the deep water hydrogen generators of the present invention can be increased to the 92–94% range by heating the water used for electrolysis. For maximum efficiency, it is desirable to heat the water to about 200° C. or higher. The water used for electrolysis can be heated in various ways using artificial and/or natural heat sources. As one example, conventional electrical resistance heating can be used as an artificial heat source to heat the water, and a conventional electrical resistance heater can be incorporated in the hydrogen generators. FIG. 12 illustrates in dotted lines a conventional electrical resistance heater 689 disposed in tank 677 adjacent inlet 682. The heater 689 can be powered with electricity supplied from the wave power generator 410 via electrical transmission cable 648. The heater 689 heats the water undergoing electrolysis to about 200° C.

FIG. 12 also depicts representative heating of the water used for electrolysis by a natural heat source. The natural heat source depicted in FIG. 12 is a naturally occurring, geothermal hot water vent 690 as found on an ocean floor or at other geothermal sites. The hydrogen generator 676 is located adjacent or close to the hot water vent 690, which typically expels a steady stream of very hot water, i.e., up to about 600° C., heated by molten rock deep inside the earth. The hydrogen generator 676 may include a temperature probe 691 which is inserted in the hot water vent 690 and which is coupled with the electrolysis unit 683. The probe 691 conducts heat from the vent 690 to the electrolysis unit 683 so that the water undergoing electrolysis is at a high temperature for increased efficiency. The temperature probe 691 comprises an extended arm 692 that is movable in an arc around the hydrogen generator 676, and the hydrogen generator may include a guidance system and/or an infrared or visual light camera to assist in directing and confirming proper positioning of probe 691 in or over vent 690. Of course, the extended arm 692, the guidance system and/or the camera can be computer-operated from a remote location. Once a tip of the probe 691 is aligned with the updraft from the vent 690, the probe can be lowered into the vent. Preferably, the tip of the probe 691 has a ball-shaped configuration so that the tip tends to remain in the updraft as the probe is lowered. The extended arm 692, which conducts heat from the tip to the electrolysis unit 683, may be made from a solid conductive metal, such as aluminum, with a high melting point or may contain a circulating liquid with a supply and return line. It is preferable that the extended arm 692 be wrapped with an insulation such as fiberglass cloth. The electrolysis unit 683 can also be insulated. The extended arm 692 could alternatively be connected to the outer flotation member 614 and could be designed as a pump to pump the hot water from vent 690 to the hydrogen generator 676, with the pumping action being effected by the vertical movement of the outer flotation member. Hydrogen generators deployed on land will preferably be located in deep bodies of water as close as feasible to geothermal sites.

As shown in FIG. 13, a plurality of hydrogen generators 676 can be clustered together, and the transfer chambers or tanks 677 of the hydrogen generators can be secured or locked together via engagement or linking devices provided on the sides or at other locations on the tanks. In multi-tank installations, the electrical power supplied from the electrical power source via the electrical transmission cable or cables is routed to a controller which distributes the electrical power to the various electrolysis units. A camera with lighting may be needed during installation to provide a view of the bottom surface or floor of the body of water to ensure that the hydrogen generators are deployed in a suitable, level location. The transport pipes 687 of the individual hydrogen generators form transport pipe segments that merge or communicate with a primary transport pipe 687'.

It may be preferable to collect the hydrogen gas from one or more off-shore hydrogen generators 676 and transfer it to a near-shore location via high-pressure transport lines or pipes. As long as the depth of the near-shore location is reasonably close to the off-shore hydrogen generators, low-pressure lines can be used to transport the hydrogen gas. From the near-shore location, typically at the edge of the continental shelf, the hydrogen gas would be transferred via high-pressure lines to the user, such as a power plant. Shore-based hydrogen generators, such as those submerged in deep water-filled wells, will preferably be located close to wind and/or solar power generation installations which will serve as the electrical power source and provide the electricity needed for electrolysis. The hydrogen gas produced by shore-based hydrogen generators will typically be transported to the surface for storage and use.

Instead of running underwater transport lines from the remote location to hydrogen generators located farther off-shore, the hydrogen gas could be stored or allowed to remain in the tanks of the hydrogen generators until the tanks are periodically retrieved or emptied. This would facilitate the placement of hydrogen generation systems in areas that have greater average wave heights but which are too far from land to justify running undersea transport lines. The tanks and the electrolysis units could be sized so that the tanks become filled with hydrogen gas at the same time or at about the same time that the electrolysis units would normally require service. Accordingly, the tanks could be retrieved, replaced or emptied at the same time that the electrolysis units are serviced to maximize efficiency and reduce down times.

A deep water hydrogen generator incorporating a linear electric generator is illustrated in FIG. 14 at 776. Deep water hydrogen generator 776 includes one or more transfer chambers or tanks 777, typically six to eight, supported on foundation 778 and an underwater linear electric generator 770 disposed between tanks 777. The foundation 778 has one or more grooves or channels 793 along its bottom surface for suction relief to prevent the foundation from becoming stuck in the mud or other material forming the bottom surface or floor of the bottom of water in which the deep water hydrogen generator is deployed. The foundation 778 is formed with pedestals for supporting the lower ends or collection points of tanks 777, respectively, and a cylindrical recess between the pedestals for supporting or receiving a lower end of the underwater linear electric generator 770.

The linear electric generator 770 includes inner elongate member 711 slidably disposed within a stationary outer member 771. The inner elongate member 711 preferably has a hollow center for reduced weight and includes one or more magnets 727, a plurality of ring magnets 727 being shown in FIG. 14 circumscribing the hollow center of inner elongate member 711. An upper end of inner elongate member 711 is connected to connecting line 719, which is coupled with a surface flotation member subjected to wave action. In particular, the connecting line 719 couples the inner elongate member 711 with a spar buoy, such as flotation member 514, as described above for linear electric generator 570. An eye structure is depicted in FIG. 14 at the upper end of inner member 711 for being connected to the connecting line 719. The outer member 771 may be tubular, with the inner member 711 slidably disposed within the tubular outer member as shown for linear electric generator 770. One or more coils to 725 is/are incorporated in or on the outer member 771. Upward and downward movement of the surface flotation member in response to wave action results in corresponding upward and downward linear movement of the inner member 711 relative to the stationary outer member 771. The magnets 727 are thereby moved linearly relative to and along coil 725 to generate electric power. Since the inner member 711 operates similar to a piston, pressure relief openings 795 are provided through the outer member 771 about a foot above the bottom of the outer member so as to reduce the resistance caused by suction as the inner member 711 is raised. When the inner member 711 is thereafter lowered, fluid contained in the bottom of the outer member 771 serves as a cushion for the inner member 711.

Electricity produced by the linear electric generator 770 is transmitted from the coil 725 to a conventional controller, which transforms the alternating current to direct current and then transmits the direct current to the electrolysis units and, if provided, to the water heaters. The controller may regulate the current by adjusting the number of electrolysis units to which the current is supplied. For example, in moderate wave conditions, less than all of the electrolysis units could receive electricity, while in heavy seas all of the electrolysis units could be supplied with electrical power. The controller would receive input in a conventional manner, including input as to whether the tanks 777 are filled, the efficiency of the electrolysis units and/or the remaining life of the electrodes of the electrolysis units.

Tanks 777 are similar to tank 677, and an electrolysis unit 783 is mounted at or adjacent the lower end or collection point of each tank 777 as described for tank 677. The tanks 777 are supported at their lower ends by the pedestals 794 of foundation 778 and at their upper end by brackets 796. The brackets 796, which are preferably designed as swing-away brackets mounted on the outer member 771, resist upward pressure created when the tanks are filled with hydrogen gas and become buoyant. In addition, the tanks 777 include upper valves or seals 797 at their upper ends and lower valves or seals 798 at their lower ends. The upper valves 797 each include a valve body 733 and a valve stem 747 depending from a lifting element 779. The valve bodies 733 are mounted, respectively, at the upper ends of tanks 777. Valve passages establishing communication with the interiors of tanks 777 extend through the valve bodies 733, respectively, and the valve stems 747 are movably disposed in the valve passages, respectively. The valve passages each have a tapered internal configuration for mating with a tapered external configuration at the lower end of the corresponding valve stem 747.

The upper valves 797 are open when the valve stems 747 are in a downward position in which the external configurations of the valve stems are not in mating engagement with the internal configurations of the valve passages, as shown in FIG. 14 for the left tank 777. The valves 797 are closed when the valve stems 747 are in an upward position in which the external configurations of the valve stems are in mating engagement with the internal configurations of the valve passages as shown for the right tank 777 in FIG. 14. The lower valves 798 are similar to the upper valves 797, and each lower valve 798 includes a valve body 733' and a valve stem 747'. The valve bodies 733' for the lower valves 798 are mounted, respectively, at the lower ends of tanks 777. The lower valves 798 are open when the valve stems 747' are in an upward position in which the external configurations of the valve stems 747' are not in mating engagement with the internal configurations of the valve bodies 733' as shown in FIG. 14 for the left tank 777. The lower valves 798 are closed when the valve stems 747' are in a downward position in which the external configurations of the valve stems 747' mate with the internal configurations of the valve bodies 733' as shown for the right tank 777 in FIG. 14.

The valve stems 747 for upper valves 797 are designed to become buoyant once the tanks 777 are significantly below the surface of the body of water; and, upon coming buoyant, the valve stems 747 will move upwardly to obtain the closed position for the upper valves. By not becoming buoyant until the tanks 777 have been lowered to a certain depth, the upper valves 797 will stay open, allowing water to enter the interior of the tanks and allowing air to exit. The valve stems 747' for the lower valves 798 are buoyant in water but will drop in a gas environment. Accordingly, the lower valves 798 will remain open as the tanks 777 are lowered to the bottom of the ocean or other body of water. Once the tanks 777 are installed or deployed at the bottom of the ocean or other body of water, the upper valves 797 are closed. The lower valves 798 remain open, allowing water 715 from the ocean or other body of water to remain in and/or to enter the interior of the tanks 777 through the open lower valves 798.

The electrolysis units 783, utilizing, for example, electricity produced by the linear electric generator 770 or electricity from other sources electrolyze the water 715 within tanks 777 such that compressed hydrogen gas 799 is generated as described above for the hydrogen generator 676. As hydrogen gas is generated at the collection points and directed into the transfer chambers or tanks 777, the tanks 777 will become filled with hydrogen gas. The left tank in FIG. 14 is illustrated partially filled with water 715 and partially filled with hydrogen gas 799, which rises above the water 715. The right tank in FIG. 14 is illustrated as being entirely filled with hydrogen gas 799. Once the lower valves 798 are surrounded with gas, the valve stems 747' will drop, thereby closing the lower valves 798 such that water cannot enter the tanks 777 as shown in FIG. 14 for the right tank 777. The tapered configurations of the valve stems 747, 747' cause the valve stems to seat tighter with the valve bodies when the tanks are raised up from the bottom of the body of water and the pressure inside the tanks increases relative to the external pressure.

A transport line (not shown) can be connected to the hydrogen generator 776 as described for hydrogen generator 676 so that hydrogen gas within the tanks 777 can be withdrawn. The lifting elements 779 can be used to facilitate raising or lifting the tanks 777 from the bottom of the ocean or other body of water. The hydrogen generator 776 can include an extended arm 792 having a tip for being positioned in or over a hot water vent as described for extended arm 692. The extended arm 792 may be tubular to pump hot water from the vent to the electrolysis units 783, and internal piping can be provided in the foundation 778 to convey the heated water to the electrolysis units. Since the vents are fragile ecosystems, care should be exercised to avoid damaging a vent when the extended arm is positioned. Alternatively, the foundation or base 778 can be fitted with legs, allowing the unit to be positioned over a hot water vent. Such vents may be 15 to 20 feet high, requiring 25 to 30 foot long legs.

The hydrogen generators of the present invention can be serviced from a ship or other sea-going vessel which would pick up the surface flotation member to which a hydrogen generator is connected and would raise the connecting line or the anchor line until the rode which runs down to the hydrogen generator can be grasped and laid over a chain or cable winch. The winch would be operated in a conventional manner to raise the hydrogen generator. The tank or tanks should be filled with hydrogen gas and, therefore, buoyant. The foundation provides just enough weight to keep the entire unit negatively buoyant. Accordingly, it should not require excessive power to raise or lift the hydrogen generation units. Since most of the corrosion to the rode will occur in the upper thirty meters or so, where more oxygen is present in the water, the upper section of the rode should be replaceable. Alternatively, the rode may be made of a synthetic, abrasion-resistant material such as Kevlar. Once the hydrogen generators have been raised entirely from the ocean or other body of water, service, repair and/or replacement can be conducted on the ship or other sea-going vessel. The hydrogen generators can then be redeployed or new hydrogen generators can be deployed from the ship or other sea-going vessel.

Additionally, although the electrolysis units are shown as being positioned under each transfer chamber, one or more electrolysis units can be positioned independently from the transfer chambers, with gas lines or channels transferring the compressed hydrogen gas from the electrolysis units to the tanks.

Although the embodiments shown are designed to be lifted as a unit from the sea floor, gas lines can be provided to transfer the hydrogen gas, with just the electrolysis units and/or linear generator removable for servicing. As pointed out above, various types of structures may be used for the transfer chambers, with the collection points associated with the electrolysis units so that compressed hydrogen gas is directed into the transfer chambers. Where the transfer chamber is a conduit leading directly from the electrolysis unit to a remote location for use or storage of the hydrogen gas, the end of the conduit defining the collection point should be coupled with the electrolysis unit in a manner preventing the entry of water into the transfer chamber.

Inasmuch as the present invention is subject to many variations, modifications, additions and changes in details, it is intended that all subject matter discussed above or shown in the accompanying drawings be interpreted as illustrative only and not be taken in a limiting sense.

What is claimed is:

1. A deep water hydrogen generation system comprising
   a deep water hydrogen generator comprising a transfer chamber for being submerged underwater at great depths and having a water inlet for water to be electrolyzed to enter said transfer chamber, an electrolysis unit for electrolyzing the water in said transfer chamber to generate compressed hydrogen gas in said transfer chamber, a transport member within said transfer chamber defining a transport channel for the compressed hydrogen gas, said transport member having a hydrogen gas inlet for directing the compressed hydrogen gas into said transport channel and having a hydrogen gas outlet for removal of the compressed hydrogen gas from said transfer chamber, and a flotation member within said transfer chamber movable in response to the level of the water in said transfer chamber to open and close said water inlet and said hydrogen gas inlet; and
   a source of electrical power coupled with said hydrogen generator for supplying electricity to electrolyze the water.

2. The deep water hydrogen generation system as recited in claim 1 wherein said source of electrical power comprises a wave power generator.

3. The deep water hydrogen generation system as recited in claim 1 wherein said source of electrical power comprises a linear electric generator.

4. The deep water hydrogen generation system as recited in claim 3 wherein said linear electric generator is an underwater linear electric generator forming part of said hydrogen generator.

5. The deep water hydrogen generation system as recited in claim 1 wherein said transfer chamber comprises a tank and further including a transport line in communication with said hydrogen gas outlet for withdrawing the compressed hydrogen gas from said tank.

6. The deep water hydrogen generation system as recited in claim 5 wherein said flotation member automatically closes said water inlet when said tank becomes filled with compressed hydrogen gas and automatically opens said water inlet for entry of water into said tank when the compressed hydrogen gas is thereafter withdrawn.

7. The deep water hydrogen generation system as recited in claim 1 said hydrogen generator further includes means for heating the water to be electrolyzed.

8. A method of producing compressed hydrogen gas at great underwater depths comprising the steps of
   deploying a transfer chamber under water at a great depth;
   introducing water to be electrolyzed into the transfer chamber via a water inlet of the transfer chamber;
   supplying electrical power to an electrolysis unit;
   electrolyzing the water in the transfer chamber with the electrolysis unit to generate compressed hydrogen gas within the transfer chamber;
   directing the compressed hydrogen gas into a transport channel within the transfer chamber via a hydrogen gas inlet of the transport channel;
   allowing a flotation member to rise and fall within the transfer chamber in accordance with the level of the water in the transfer chamber; and
   closing and opening the hydrogen gas inlet and the water inlet in response to the rise and fall of the flotation member.

9. The method recited in claim 8 wherein said step of deploying includes deploying the transfer chamber and electrolysis unit underwater at a depth of about one thousand feet or more.

10. The method recited in claim 8 wherein said step of deploying includes deploying the transfer chamber and electrolysis unit in the ocean.

11. The method recited in claim 8 wherein said step of deploying includes deploying the transfer chamber and electrolysis unit in an on-shore body of water.

12. The method recited in claim 8 and further including the step of heating the water that is electrolyzed.

13. The method recited in claim 12 wherein said step of heating includes heating the water with a natural heat source.

14. The method recited in claim 13 wherein said step of heating includes heating the water geothermally.

15. The method recited in claim 12 wherein said step of heating includes heating the water electrically.

16. The method recited in claim 12 wherein said step of heating includes heating the water to about 200° C. or higher.

17. The method recited in claim 8 wherein said step of electrolyzing includes electrolyzing saltwater.

18. The method recited in claim 8 wherein said step of electrolyzing includes electrolyzing fresh water.

19. The method recited in claim 8 and further including the step of supplying electrical power to the electrolysis unit from a remote location.

* * * * *